(12) United States Patent
Kato et al.

(10) Patent No.: US 9,864,191 B2
(45) Date of Patent: Jan. 9, 2018

(54) VIEWER WITH VARIFOCAL LENS AND VIDEO DISPLAY SYSTEM

(71) Applicant: PANASONIC CORPORATION, Osaka (JP)

(72) Inventors: Yumiko Kato, Osaka (JP); Tsuyoshi Inoue, Nara (JP); Jun Ozawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 206 days.

(21) Appl. No.: 14/284,141

(22) Filed: May 21, 2014

(65) Prior Publication Data

US 2014/0347456 A1 Nov. 27, 2014

(30) Foreign Application Priority Data

May 21, 2013 (JP) ................................ 2013-107063

(51) Int. Cl.
*H04N 13/04* (2006.01)
*H04N 9/47* (2006.01)
*G02B 27/00* (2006.01)
*G06K 9/00* (2006.01)

(52) U.S. Cl.
CPC ..... *G02B 27/0093* (2013.01); *H04N 13/0429* (2013.01); *H04N 13/0484* (2013.01); *G06K 9/00597* (2013.01); *H04N 2213/008* (2013.01)

(58) Field of Classification Search
CPC ........ G02B 2027/0178; G02B 27/0172; G02B 27/0093; G06T 19/006; G06T 2207/10021; G06T 2207/30201; G06T 2207/30196; G06F 3/013; G06F 3/011; G06F 3/012

USPC .......................................................... 348/59
See application file for complete search history.

(56) References Cited

U.S. PATENT DOCUMENTS

| 6,619,799 | B1 | 9/2003 | Blum et al. |
| 2004/0233275 | A1* | 11/2004 | Tomita ............... G02B 27/0093 348/51 |
| 2006/0232665 | A1* | 10/2006 | Schowengerdt ... G02B 27/0093 348/51 |
| 2010/0134900 | A1* | 6/2010 | Ori ....................... G02B 15/173 359/684 |

(Continued)

FOREIGN PATENT DOCUMENTS

| JP | 04-273211 A | 9/1992 |
| JP | 07-88143 A | 4/1995 |

(Continued)

OTHER PUBLICATIONS

Sakashita et al., Electronics and Communications in Japan, vol. 92, No. 11, pp. 9-18, 2009, Translated from Denki Gakkai Ronbunshi, vol. 127-C, No. 4, Apr. 2007, pp. 591-598.

*Primary Examiner* — Jared Walker
(74) *Attorney, Agent, or Firm* — McDermott Will & Emery LLP

(57) ABSTRACT

A viewer includes a varifocal lens and a lens controller that adjusts a focal length of the varifocal lens, and can adjust a focal point in accordance with eye movement of the user. When a 3D image viewing detector detects 3D image viewing by the user, a focal length fixing section instructs a lens controller to fix a focal length of the varifocal lens irrespective of eye movement of the user.

13 Claims, 22 Drawing Sheets

(56) References Cited

U.S. PATENT DOCUMENTS

| | | | | |
|---|---|---|---|---|
| 2011/0037837 A1* | 2/2011 | Chiba | ............... | H04N 13/0438 |
| | | | | 348/53 |
| 2011/0178784 A1 | 7/2011 | Sato et al. | | |
| 2012/0113092 A1* | 5/2012 | Bar-Zeev | ............. | G02B 27/017 |
| | | | | 345/419 |
| 2012/0154556 A1* | 6/2012 | An | ..................... | G02B 27/2214 |
| | | | | 348/51 |
| 2012/0306860 A1* | 12/2012 | Hatta | ...................... | A63F 13/10 |
| | | | | 345/419 |
| 2012/0308193 A1* | 12/2012 | Takayama | .............. | H04N 5/783 |
| | | | | 386/230 |

FOREIGN PATENT DOCUMENTS

| | | |
|---|---|---|
| JP | 2011-125693 A | 6/2011 |
| JP | 2011-209749 A | 10/2011 |

\* cited by examiner

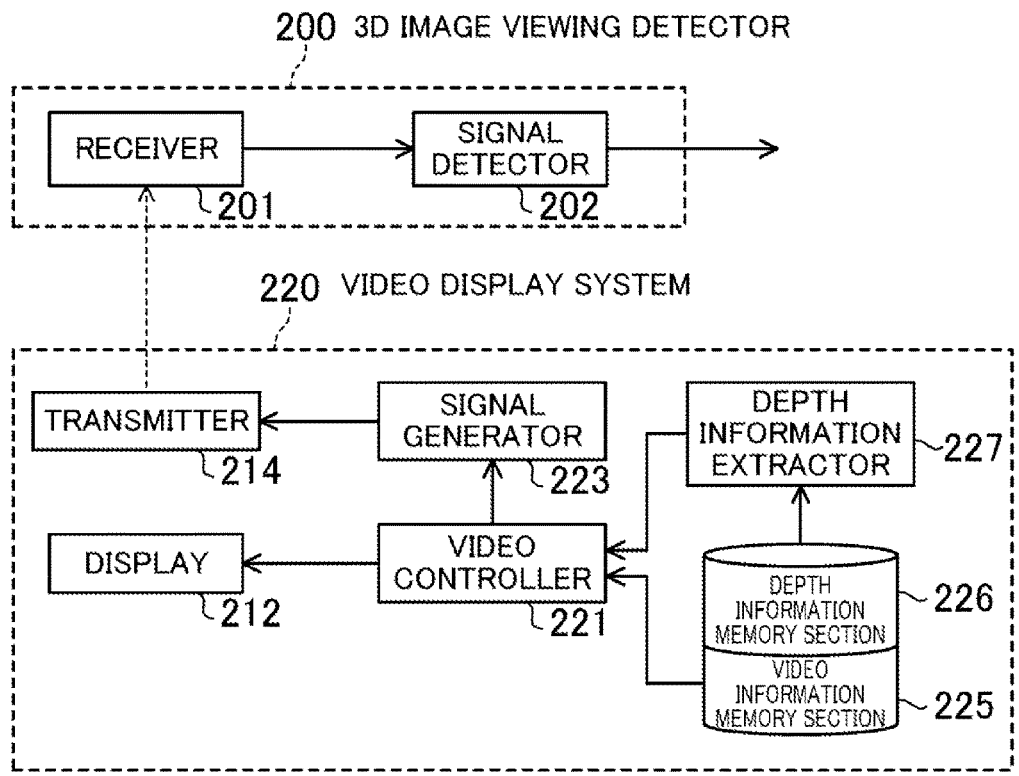

FIG. 19
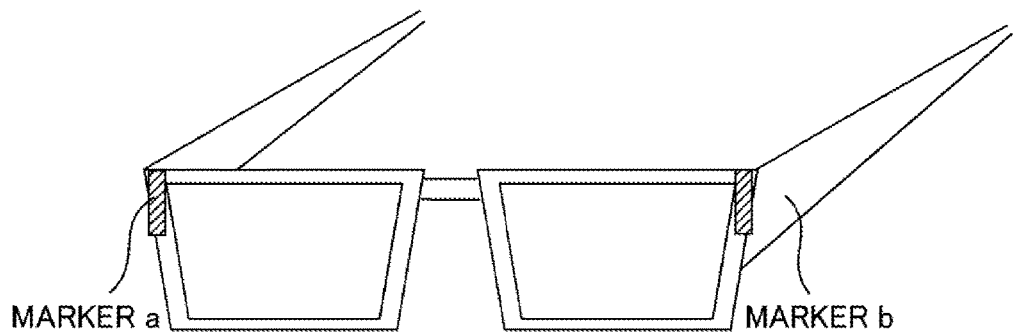
FIG. 20A
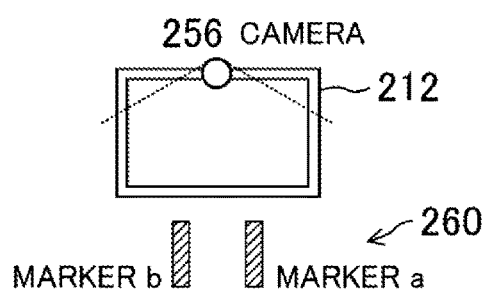
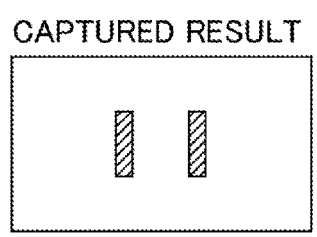
FIG. 20B
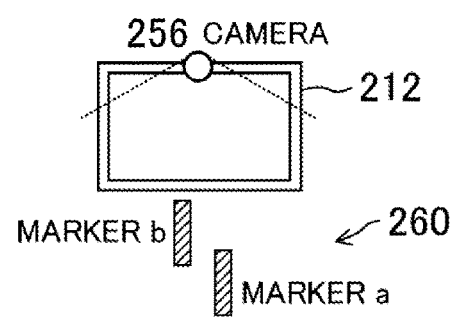
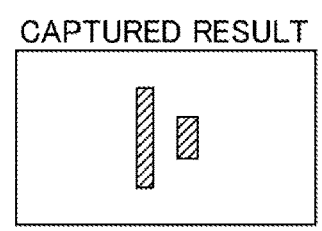

LIGHT RECEPTION RANGE OF 3D-TELEVISION GLASSES

LIGHT RECEPTION RANGE OF VIEWER

2D IMAGE VIEWING
(WITH CONSTANT CONVERGENCE ANGLE)

VARIFOCAL LENS
USE'S EYES

3D IMAGE VIEWING
(WITH CONVERGENCE ANGLE VARYING AMONG OBJECTS)

3D TELEVISION SHUTTER
VARIFOCAL LENS
USE'S EYES

VIEWER WITH VARIFOCAL LENS AND VIDEO DISPLAY SYSTEM

CROSS-REFERENCE TO RELATED APPLICATION

This application claims priority to Japanese Patent Application No. 2013-107063 filed on May 21, 2013, the entire disclosure of which is incorporated by reference herein.

BACKGROUND

The present disclosure relates to viewers having varifocal lenses and automatically adjusting focal lengths of the lenses in accordance with eye movement of users.

Human beings move their gazing points, i.e., points of fixation, by means of eye movement. The eyes also move when the gazing points move in the depth direction. This movement is particularly called vergence eye movement.

Japanese Unexamined Patent Publication No. H04-273211 describes a technique in which a gazing point is obtained by detecting a change in electro-oculogram caused by eye movement so that the focal length of a varifocal lens is adjusted in accordance with the gazing point.

SUMMARY

FIG. 27 schematically illustrates a relationship between a stereoscopic three-dimensional (3D) image and vergence eye movement. The stereoscopic 3D image shows a 3D depth by presenting a right-eye image and a left-eye image to the right eye and the left eye, respectively, of a user. The display showing an image is a two-dimensional (2D) display device, and as illustrated in FIGS. 27A and 27B, natural eye movement occurring when a human sees an object with both eyes in 3D space (vergence eye movement) is reproduced by presenting images separately to the left and right eyes. Specifically, a stereoscopic technique achieves viewing of a 3D image by reproducing eye movement occurring when the gazing point moves in the depth direction, which is employed for controlling a varifocal lens in Japanese Unexamined Patent Publication No. H04-273211, to an image displayed on a flat display.

The right-eye image is an image viewed from the right-eye position of the user, and the left-eye image is an image viewed from the left-eye position of the user. Thus, a parallax occurs depending on the depth position between the left-eye and right-eye images of an identical subject. When the user fixates, or gazes at, a subject in an image, the user adjusts the angle of each of the right eye and the left eye based on a parallax between the left-eye and right-eye images. This eye adjustment corresponds to vergence eye movement occurring when the gazing point moves in the depth direction. That is, for viewing of a stereoscopic 3D image, the eyes of the user move in a manner similar to the movement when the user gazes at a virtual depth position created by the parallax between the left-eye and right-eye images. On the other hand, the image itself is presented on a flat display, and is not displayed at the gazing point derived from the eye movement. Thus, to see an image clearly, the focal point needs to be fixed on the flat display.

FIGS. 28A and 28B schematically illustrate a relationship between an object and a convergence angle of eyes. FIG. 28A shows 2D image viewing, and FIG. 28B shows 3D image viewing. As illustrated in FIG. 28A, when seeing a 2D image viewing, the left and right eyes of the user see the same image. That is, irrespective of an object on which the user is focused in an image, the line-of-sights from the left and right eyes intersect on the screen. Thus, the convergence angle of the eyes of the user is determined based on the distance from the screen, and is substantially constant though slightly varying among the angles at which the user sees the object.

On the other hand, as illustrated in FIG. 28B, in the case of seeing a 3D image, a parallax is provided between images presented to the left and right eyes. Thus, the line-of-sights from the left and right eyes of the user intersect at the depth position of an object in an image, and do not necessarily intersect on the surface of the screen. Accordingly, the convergence angle of the eyes of the user differs among objects.

Suppose the focal length of a lens is adjusted in order to obtain a gazing point from eye movement, i.e., movement of forming a convergence angle, in viewing of a stereoscopic 3D image, as described in Japanese Unexamined Patent Publication No. H04-273211, the focal length of the lens is unintentionally adjusted to a virtual depth position formed by a parallax. In addition, since a 3D image is also displayed on the screen surface of a display, when the 3D image is viewed with a viewer for adjusting the focal length in accordance with eye movement, the focal length is unintentionally adjusted to a depth position different from the screen surface. Consequently, the user cannot clearly see an image displayed on the display screen. As a result, the 3D image cannot be viewed appropriately and comfortably.

It is therefore an object of the present disclosure to provide a viewer capable of adjusting a focal point in accordance with eye movement of a user and enabling the user to view a stereoscopic 3D image appropriately and comfortably.

A viewer in an aspect of the present disclosure is a viewer capable of adjusting a focal point in accordance with eye movement of a user, and the viewer includes: a varifocal lens; a lens controller that adjusts a focal length of the varifocal lens; a detector that detects 3D image viewing of the user; and a focal length fixing section that instructs the lens controller to fix the focal length of the varifocal lens irrespective of eye movement of the user when the detector detects 3D image viewing of the user.

In this viewer, when 3D image viewing of the user is detected, the focal length of the varifocal lens is fixed, irrespective of eye movement of the user. This configuration can eliminate the problem that the focal point is unintentionally focused on a depth position different from a screen in accordance with eye movement to a virtual gazing point when the user views a 3D image. Thus, even a user wearing a viewer that automatically adjusts a focal length can view a 3D image appropriately and comfortably.

With the technique disclosed herein, even when a user wears a viewer that automatically adjusts a focal length in accordance with eye movement, the focal length is fixed when 3D image viewing is detected. Thus, the user can view a 3D image appropriately and comfortably.

BRIEF DESCRIPTION OF THE DRAWINGS

FIG. 9 is a block diagram showing example configurations of a 3D image viewing detector of a viewer and part of a video display system according to a first variation of the first embodiment.

FIG. 10 schematically shows an example of information stored in a depth information memory section and a video information memory section of the video display system shown in FIG. 9.

FIG. 19 schematically illustrates the viewer of the second embodiment when viewed from the front.

FIGS. 20A and 20B schematically illustrate relationships between the orientation of the viewer and marker images captured by a camera of the video display system.

FIG. 28A shows 2D image viewing, and FIG. 28B shows 3D image viewing.

DETAILED DESCRIPTION

Figure 1:
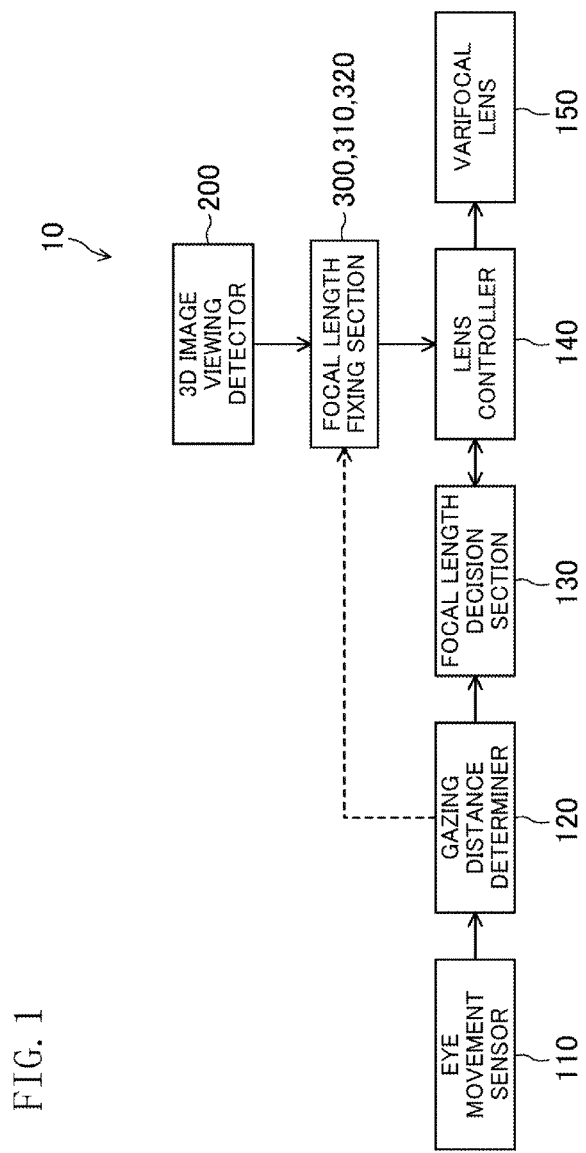
FIG. 1 is a block diagram showing an example configuration of a viewer according to a first embodiment.

In a first aspect of the present disclosure, a viewer capable of adjusting a focal point in accordance with eye movement of a user includes: a varifocal lens; a lens controller that adjusts a focal length of the varifocal lens; a detector that detects 3D image viewing of the user; and a focal length fixing section that instructs the lens controller to fix the focal length of the varifocal lens irrespective of eye movement of the user when the detector detects 3D image viewing of the user.

In a second aspect of the present disclosure, in the viewer of the first aspect, the detector includes: a receiver that receives an information signal transmitted from a video display system; and a signal detector that determines that the user views a 3D image when the information signal received by the receiver includes a signal indicating 3D image presentation.

In a third aspect of the present disclosure present disclosure, in the viewer of the second aspect, the focal length fixing section estimates a distance from the user to a display device by using the information signal, and determines a focal length to be fixed based on the estimated distance.

In a fourth aspect of the present disclosure, the viewer of the third aspect further includes a gazing distance determiner that determines a gazing distance of the user based on the eye movement of the user, and the information signal further includes depth information on a 3D image presented by the video display system when the information signal includes the signal indicating 3D image presentation, and the focal length fixing section estimates the distance from the user to the display device based on a result of determination by the gazing distance determiner when the depth information indicates that a depth position of the 3D image is at a screen position of the display device.

In a fifth aspect of the present disclosure, in the viewer of the third aspect, when the information signal includes the signal indicating 3D image presentation, the information signal further includes screen size information on the display device, and the focal length fixing section estimates the distance from the user to the display device based on the screen size information in accordance with a rule in which the distance from the user to the display device increases as a screen size of the display device increases.

In a sixth aspect of the present disclosure, in the viewer of the first aspect, focal lengths to be selected in the varifocal lens are limited to a plurality of focal lengths, and in fixing the focal length of the varifocal lens, the focal length fixing section fixes a focal point of the varifocal lens at a largest focal length among the plurality of focal lengths.

In a seventh aspect of the present disclosure, the viewer of the second aspect further includes a marker that is recognized as a predetermined shape when viewed from a front.

In an eighth aspect of the present disclosure, in the viewer of the seventh aspect, the marker comprises a plurality of markers, and the plurality of markers are disposed symmetrically at left and right ends of a front surface of the viewer.

In a ninth aspect of the present disclosure, in the viewer of the second aspect, the video display system transmits the information signal through a medium showing high straightness in travelling, in the viewer, a reception range of the medium is limited to a predetermined range including a front of the viewer, and the predetermined range is set in a range within 60 degrees to each of left and right sides relative to the front.

In a tenth aspect of the present disclosure, in the viewer of the ninth aspect, the video display system uses 3D image glasses, and transmits a synchronizing signal to the 3D image glasses through the medium, and in the viewer, the reception range of the medium is narrower than that of the 3D image glasses.

In an eleventh aspect of the present disclosure, in the viewer of the ninth aspect, the medium is infrared light or visible light.

A video display system in a twelfth aspect of the present disclosure is configured to transmit an information signal to the viewer of the seventh aspect, and includes: a display device; a camera that captures a view in front of the display device; and a viewing behavior detector that determines whether a user wearing the viewer looks toward the display device or not based on whether an image of the marker is recognized as the predetermined shape or not, when the viewer is captured by the camera. In the video display system, when the viewing behavior detector determines that the user does not look toward the display device, transmission of a signal indicating 3D image presentation as the information signal is avoided.

In a thirteenth aspect of the present disclosure, in the video display system of the twelfth aspect, the viewer transmits a viewer signal when a focal point is adjusted in accordance with eye movement of the user, and when the viewing behavior detector determines that the user looks toward the display device and receives the viewer signal, the video display system transmits the signal indicating 3D image presentation as the information signal.

These general or specific aspects may be implemented by systems, methods, integrated circuits, computer programs, or recording media such as computer-readable CD-ROMs, and may also be implemented by any combination of a system, a method, an integrated circuit, a computer program, and a recording media.

Viewers according to embodiments of the present disclosure will be specifically described with reference to the drawings.

Embodiments described below are examples of the present disclosure. Values, shapes, components, locations and connection states of the components, steps, the order of states, etc. described in the following embodiments are examples, and are not intended to limit the scope of the invention. Among the components in the following description, components not recited in an independent claim representing the broadest concept will be described as optional components.

First Embodiment

In a first embodiment, a viewer such as glasses or goggles, having a varifocal lens and capable of adjusting a focal point in accordance with eye movement of a user will be described. The viewer of this embodiment fixes the focal length of the varifocal lens when a user wearing the viewer views a stereoscopic 3D image (hereinafter simply referred to as a 3D image).

FIG. 1 is a block diagram showing an example configuration of the viewer of this embodiment. A viewer 10 shown in FIG. 1 includes an eye movement sensor 110, a gazing distance determiner 120, a focal length decision section 130, a lens controller 140, a varifocal lens 150, a 3D image viewing detector 200, and a focal length fixing section 300. Focal length fixing sections 310 and 320 will be described later in first and second variations of the embodiment.

The eye movement sensor 110 is a sensor for sensing eye movement of a user, and is specifically a camera or a sensor for a biological signal, for example. The eye movement sensor 110 outputs eye movement information on the user to the gazing distance determiner 120.

Based on the eye movement information on the user output from the eye movement sensor 110, the gazing distance determiner 120 determines a gazing distance of the user, which is a depth position of the user, i.e., the distance from the user to the gazing point of the user. The gazing distance determiner 120 outputs gazing distance information on the user to the focal length decision section 130.

The focal length decision section 130 decides a focal length of the varifocal lens 150 based on the gazing distance information from the gazing distance determiner 120. The focal length decision section 130 outputs focal length information to the lens controller 140.

The lens controller 140 generates a control signal for adjusting the focal length of the varifocal lens 150, based on the focal length information output from the focal length decision section 130 and a fixing signal output from the focal length fixing section 300. The generated control signal is output to the varifocal lens 150. The fixing signal has priority to the focal length information. That is, upon reception of a fixing signal, the lens controller 140 generates a control signal in accordance with the focal length directed by the fixing signal. With no input of a fixing signal, the lens controller 140 generates a control signal based on the focal length information. The control signal varies depending on the type of the varifocal lens 150.

The varifocal lens 150 changes the focal length of the lens based on the control signal output from the lens controller 140. The method for controlling the focal length of the varifocal lens 150 varies depending on the type of the varifocal lens 150. The focal length may be continuously changed, or alternatively, may be selected from a plurality of predetermined focal lengths. The type and control of the varifocal lens will be described in detail below.

The 3D image viewing detector 200 detects a state in which the user views a 3D image. In this example, the 3D image viewing detector 200 receives an information signal transmitted from outside the viewer 10, and if the received information signal includes a signal indicating 3D image presentation, determines that the user views a 3D image. Specifically, for example, the information signal indicating 3D image presentation may be transmitted as an electrical signal, a radio signal, or an infrared signal, from a 3D image display device or a video signal output device, for example. Alternatively, the information signal may also be a shutter control signal of 3D image glasses. The 3D image viewing detector 200 outputs, to the focal length fixing section 300, viewing information that is information on whether the user views a 3D image or not.

The focal length fixing section 300 receives the viewing information from the 3D image viewing detector 200. When the viewing information indicates that the user views a 3D image, the focal length fixing section 300 generates a fixing signal instructing fixing the focal length to a predetermined distance, and outputs the fixing signal to the lens controller

140. That is, when the 3D image viewing detector 200 detects that the user views a 3D image, the focal length fixing section 300 instructs the lens controller 140 to fix the focal length of the varifocal lens 150, irrespective of eye movement of the user.

<Detail of Varifocal Lens 150>

In this example, it is assumed that the varifocal lens 150 is capable of continuously changing the focal length from 10 cm to 3 m. Such a varifocal lens can be implemented by changing the shape of the lens through charging with liquid and changing a charging pressure, as described in Japanese Unexamined Patent Publication No. H07-88143. The control signal output from the lens controller 140 is, for example, an electrical signal for adjusting the charging pressure of the varifocal lens 150.

As proposed in Japanese Unexamined Patent Publication No. 2011-209749, the varifocal lens 150 may obtain an arbitrary focal length by changing the angle of crystal of a liquid crystal material. In this case, the control signal output from the lens controller 140 is, for example, a voltage applied in order to determine the angle of crystal of a liquid crystal material.

<Detail of 3D Image Viewing Detector 200>

Figure 2:
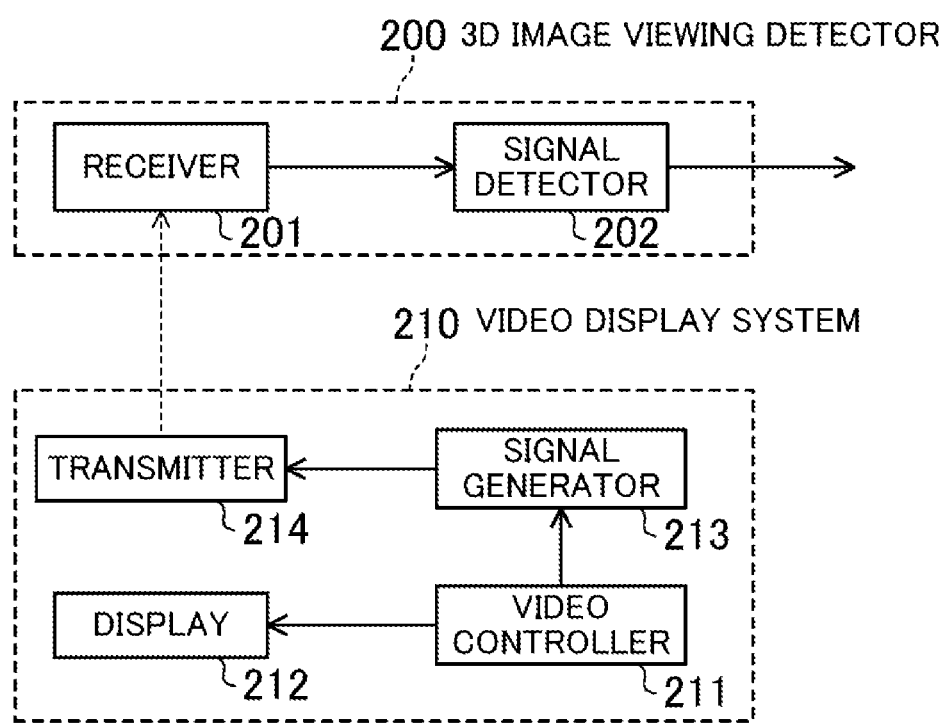
FIG. 2 is a block diagram showing example configurations of a 3D image viewing detector of the viewer of the first embodiment and part of a video display system.

FIG. 2 is a block diagram showing example configurations of the 3D image viewing detector 200 of the viewer 10 and part of a video display system 210 that transmits an information signal of this embodiment.

The video display system 210 reproduces data transmitted through, for example, broadcasting or network communication or distribution or stored in a storage medium such as a hard disk, and displays a 3D image or a 2D image. Specifically, the video display system 210 is a television system, a reproducing device, or a recorder, for example. In FIG. 2, the video display system 210 includes a video controller 211, a display 212 serving as a display device, a signal generator 213, and a transmitter 214. In addition to the components shown in FIG. 2, the video display system 210 includes components, such as an image processor and a memory section, necessary for displaying a 3D image, but these components are not shown.

The display 212 displays a 3D image or a 2D image. In the case of displaying a 3D image, the display 212 displays a right-eye image and a left-eye image such that the right-eye image and the left-eye image are seen only by the right eye and the left eye, respectively, of the user. A display technique of a 3D image includes a technique of using dedicated glasses of, for example, an active shutter type or a passive shutter type and a technique of adjusting the optical angle between a right-eye image and a left-eye image by using a special lens or a filter placed on the screen surface, for example.

The video controller 211 acquires a video signal, converts the video signal into a display signal, and outputs the display signal to the display 212. In the case of a 3D image, the video signal is converted into a right-eye image and a left-eye image in accordance with a display type of the display 212, and outputs these images to the display 212. In the case of a 3D image, the video controller 211 outputs a signal indicating that an image is a 3D image, to the signal generator 213. Upon reception of the signal indicating that the image is a 3D image from the video controller 211, the signal generator 213 generates a signal indicating 3D image presentation as an information signal, and outputs the signal to the transmitter 214. The transmitter 214 transmits the information signal generated by the signal generator 213. The information signal is transmitted as, for example, a radio signal or an infrared signal.

The 3D image viewing detector 200 includes a receiver 201 and a signal detector 202. The receiver 201 receives an information signal transmitted from the transmitter 214 of the video display system 210. The signal detector 202 determines whether the information signal received by the receiver 201 includes a signal indicating 3D image presentation or not. If it is determined that the information signal includes a signal indicating 3D image presentation, the signal detector 202 determines that the user views a 3D image, and outputs viewing information indicating this viewing to the focal length fixing section 300.

<Detail of Eye Movement Sensor 110>

Figure 3:
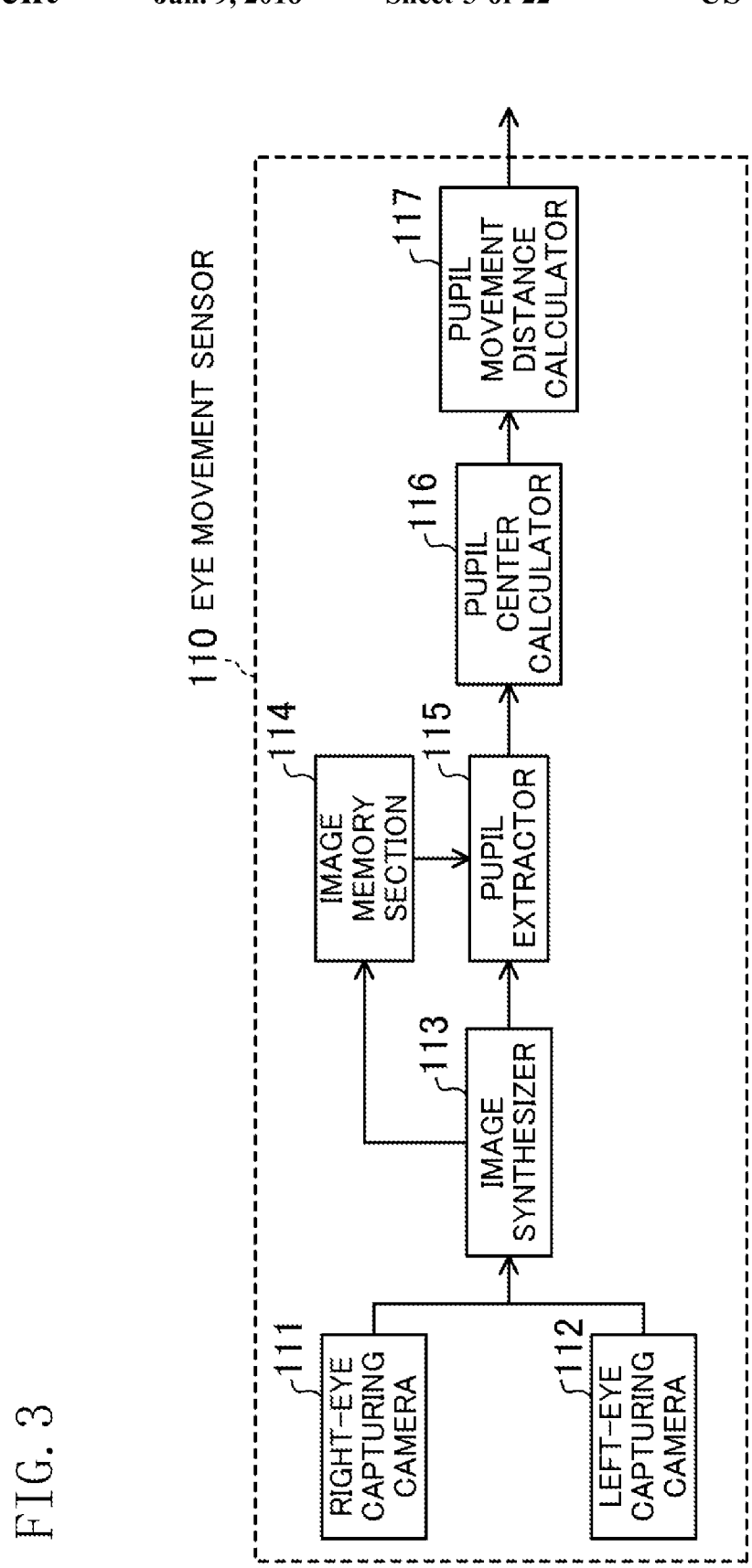
FIG. 3 is a block diagram showing an example configuration of an eye movement sensor of the viewer shown in FIG. 1.

FIG. 3 is a block diagram showing an example configuration of the eye movement sensor 110 in detail. The eye movement sensor 110 includes, for example, a right-eye capturing camera 111, a left-eye capturing camera 112, an image synthesizer 113, an image memory section 114, a pupil extractor 115, a pupil center calculator 116, and a pupil movement distance calculator 117.

The right-eye capturing camera 111 captures an image of the right eye of the user. The left-eye capturing camera 112 captures an image of the left eye of the user. The image synthesizer 113 combines the image captured by the right-eye capturing camera 111 and the image captured by the left-eye capturing camera 112 with the times and scales thereof being matched each other, thereby synthesizing a single image. The image memory section 114 stores the single image synthesized by the image synthesizer 113. The period for storing the image is at least a period corresponding to frames necessary for capturing of the right-eye capturing camera 111 or the left-eye capturing camera 112.

The pupil extractor 115 extracts left and right pupils from the single-plane image synthesized by the image synthesizer 113. The pupil extractor 115 also extracts pupils appearing on images that have been stored in the image memory section 114 in one or more frames before the synthesized image. That is, the pupil extractor 115 extracts pupils on the current image and previous images. The pupil center calculator 116 calculates coordinates of centers of pupils on the current image and the previous images extracted by the pupil extractor 115. As proposed in YUUSUKE SAKASHITA, HIRONOBU FUJIYOSHI, YUTAKA HIRATA, HISANORI TAKAMARU, and NAOKI FUKAYA, "Real-Time Measurement of Cycloduction Movement Based on Fast Ellipse Detection", Electronics and Communications in Japan, Vol. 92, No. 11, pp. 9-18, 2009, Translated from Denki Gakkai Ronbunshi, Vol. 127-C, No. 4, April 2007, pp. 591-598, a pupil center is obtained by, for example, assuming an extracted pupil as an ellipse, performing matching on the extracted pupil and the ellipse in the image, and using the center of the ellipse having a minimum error as the center of the pupil. As another technique, a perfect circle may be used instead of an ellipse.

The pupil movement distance calculator 117 determines whether the center coordinates of the left and right pupils calculated by the pupil center calculator 116 differ from those in an image in at least one frame previous to the current image, and calculates the movement distance of the center coordinates of the left and right pupils. That is, the pupil movement distance calculator 117 compares the center coordinates of the past pupil with the center coordinates of the current pupil, and calculates the movement distance of the pupil. If the movement distance of the pupil center coordinates is larger than a predetermined distance, the pupil movement distance calculator 117 detects this movement as eye movement. The pupil movement distance calculator 117 outputs the calculated movement distance and the center coordinates of the left and right pupils calculated by the pupil center calculator 116, to the gazing distance determiner 120.

In this example, the eye movement sensor 110 uses cameras for capturing eyes. However, the present disclosure is not limited to this example. As described in, for example, Japanese Unexamined Patent Publication No. 2011-125693, the distance of the gazing point of the user may be estimated based on electro-oculograms acquired from a plurality of electrodes that are in contact with portions around the eyes.

<Detail of Perception Distance Determiner 120>

Figure 4:
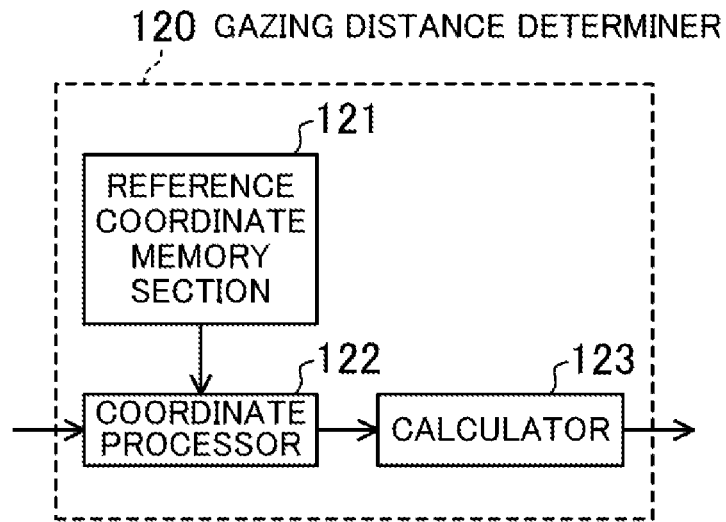
FIG. 4 is a block diagram showing an example configuration of a gazing distance determiner of the viewer shown in FIG. 1.

FIG. 4 is a block diagram showing an example configuration of the gazing distance determiner 120 in detail. The gazing distance determiner 120 includes, for example, a reference coordinate memory section 121, a coordinate processor 122, and a calculator 123. The depth position is obtained from eye movement called disconjugate eye movement or vergence eye movement of both eyes. The vergence eye movement is movement in which motion components on a line (a horizontal line in an upright head position) connecting both eyes and extending perpendicularly to the midline of the head move in opposite directions in the left and right eyes. The depth position is determined based on the degree of vergence eye movement.

The reference coordinate memory section 121 stores the coordinates of the left and right pupil centers when the user gazes at the point at infinity located on the midline, i.e., directly in front of the user, as reference coordinates. The coordinate processor 122 places the coordinates of the left and right pupil centers output from the eye movement sensor 110 and the reference coordinates stored in the reference coordinate memory section 121 on the horizontal line.

Figure 5:
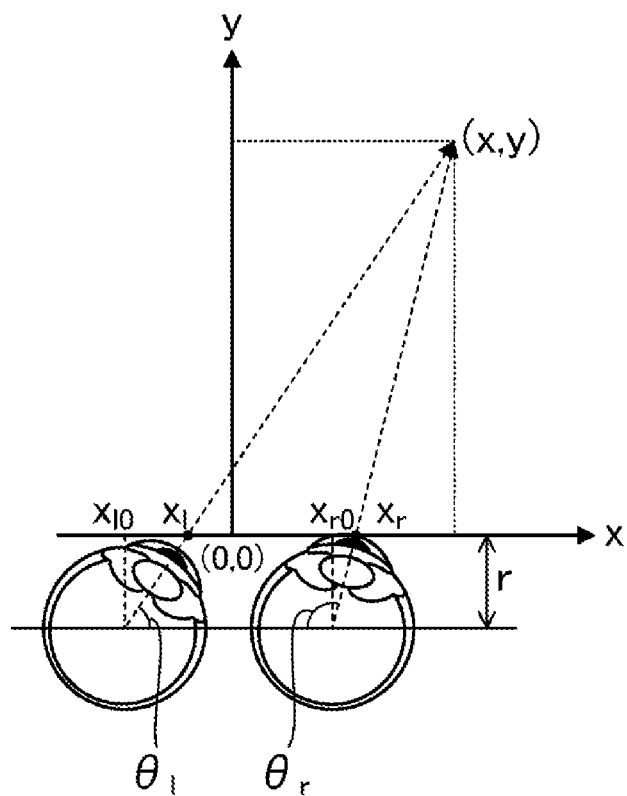
FIG. 5 schematically illustrates a method for calculating a gazing distance from eye movement.

The calculator 123 obtains a positional shift between the pupil centers when the user gazes at the point at infinity directly in front of the user and the current pupil centers, and by using a predetermined radius of eyeballs, calculates a current rotational angle of the eyeballs. FIG. 5 schematically illustrates a method for calculating a gazing distance. Assuming that the rotational angle when the user gazes at the point at infinity is zero degrees, from the coordinates of the pupil centers in the horizontal direction, the gazing distance can be calculated as follows:

$$\begin{cases} \tan\theta_l = \frac{y+r}{x-x_{l0}} \\ \tan(\pi-\theta_r) = \frac{y+r}{x-x_{r0}} \end{cases} \Rightarrow \begin{cases} x = \frac{x_{l0} \times \tan\theta_l + x_{r0} \times \tan\theta_r}{\tan\theta_l + \tan\theta_r} \\ y = \frac{(x_{r0} - x_{l0})\tan\theta_l \tan\theta_r}{\tan\theta_l + \tan\theta_r} - r \end{cases}$$ [Expression 1]

$$x_l - x_{l0} = r\cos\theta_l \therefore \theta_l = \cos^{-1}\left[\frac{x_l - x_{l0}}{r}\right]$$

$$x_r - x_{r0} = -r\cos\theta_r \therefore \theta_r = \cos^{-1}\left[\frac{x_{r0} - x_r}{r}\right]$$

$$(x_l < 0, x_{l0} < 0)$$

where
x: coordinate of the gazing point parallel to the forehead on horizontal plane coordinates,
y: coordinate of the gazing point parallel to the median plane on horizontal coordinates,
$\theta_l$: rotational angle of the left eye,
$\theta_r$: rotational angle of the right eye,
$x_{l0}$: pupil center of the left eye when the user gazes at the point at infinity,
$x_{r0}$: pupil center of the right eye when the user gazes at the point at infinity,
$x_l$: pupil center of the left eye when the user gazes at coordinates (x, y),
$x_r$: pupil center of the right eye when the user gazes at coordinates (x, y), and
r: radius of the eyeball.

$$x = \frac{x_{l0}\tan\left\{\cos^{-1}\left[\frac{x_l - x_{l0}}{r}\right]\right\} + x_{r0}\tan\left\{\cos^{-1}\left[\frac{x_{r0} - x_r}{r}\right]\right\}}{\tan\left\{\cos^{-1}\left[\frac{x_l - x_{l0}}{r}\right]\right\} + \tan\left\{\cos^{-1}\left[\frac{x_{r0} - x_r}{r}\right]\right\}}$$ [Expression 2]

$$y = \frac{(x_{r0} - x_{l0})\tan\left\{\cos^{-1}\left[\frac{x_l - x_{l0}}{r}\right]\right\}\tan\left\{\cos^{-1}\left[\frac{x_{r0} - x_r}{r}\right]\right\}}{\tan\left\{\cos^{-1}\left[\frac{x_l - x_{l0}}{r}\right]\right\} + \tan\left\{\cos^{-1}\left[\frac{x_{r0} - x_r}{r}\right]\right\}} - r$$

<Detail of Focal Length Fixing Section 300>

Figure 6:
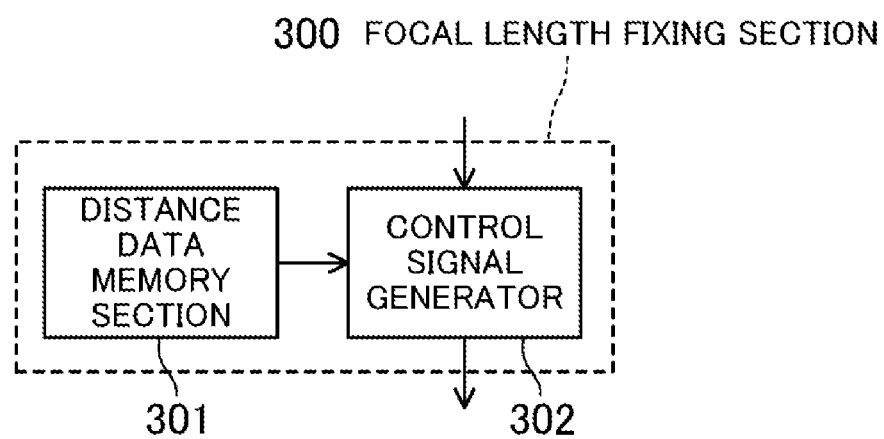
FIG. 6 is a block diagram showing an example configuration of a focal length fixing section of the viewer shown in FIG. 1.

FIG. 6 is a block diagram showing an example configuration of the focal length fixing section 300 in detail. The focal length fixing section 300 illustrated in FIG. 6 includes a distance data memory section 301 and a control signal generator 302.

The distance data memory section 301 stores data on a focal length of the varifocal lens 150 that is to be fixed when it is determined that the user views a 3D image. The focal length to be fixed is, for example, 2 m in this embodiment.

If the viewing information output from the 3D image viewing detector 200 indicates viewing of a 3D image by the user, the control signal generator 302 generates a control signal for fixing the focal length of the varifocal lens 150 to a focal length stored in the distance data memory section 301, and outputs the control signal to the lens controller 140.

<Operation of Viewer>

Figure 7:
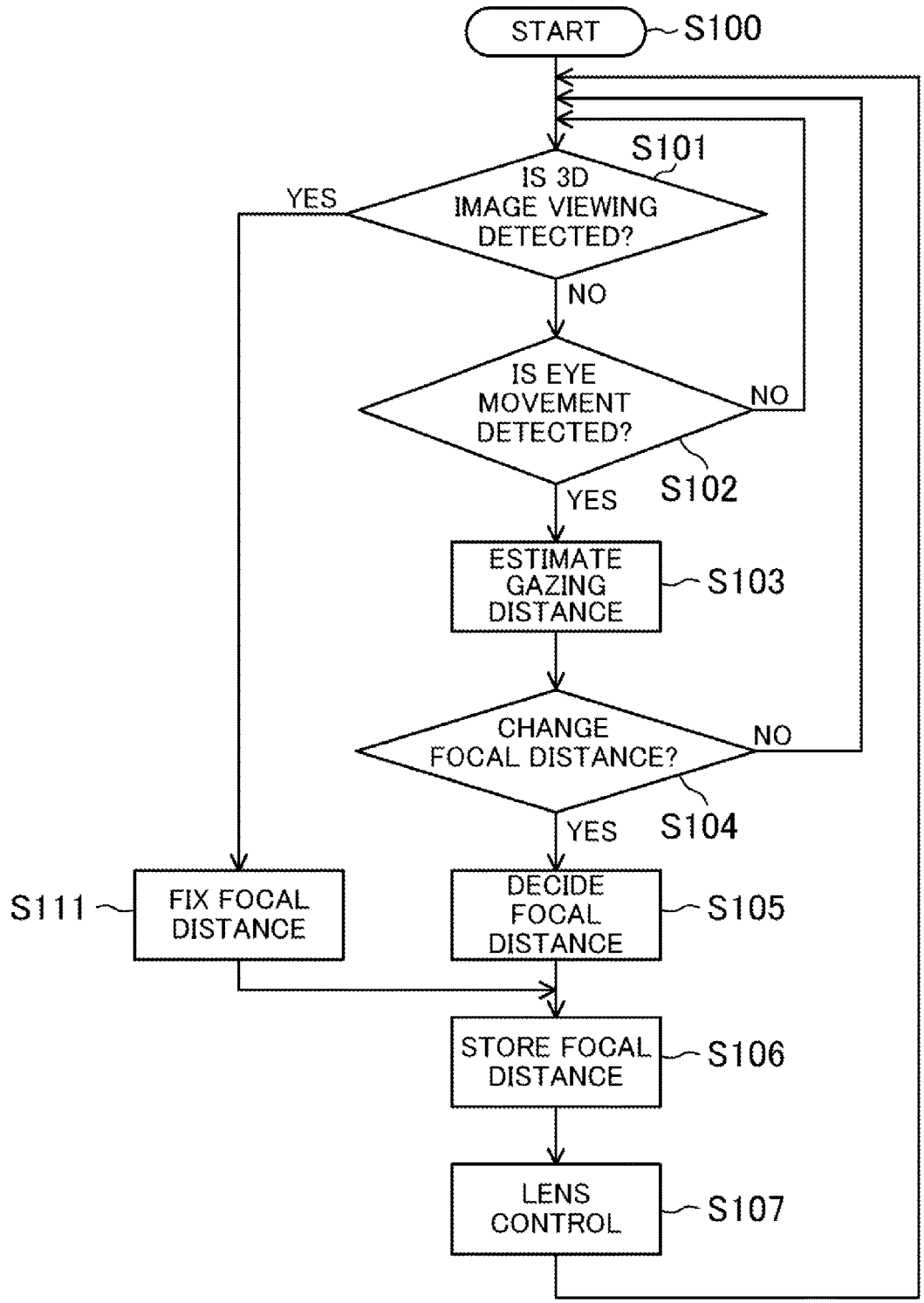
FIG. 7 is a flowchart showing an example of operation of the viewer of the first embodiment.

FIG. 7 is a flowchart showing operation of the viewer 10 of this embodiment. Referring to FIG. 7, operation of the viewer 10 will be described.

When the viewer 10 is powered on, operation of the viewer 10 starts (S100). Then, the 3D image viewing detector 200 starts operating, receives an externally transmitted information signal, and determines whether the received information signal includes a signal indicating 3D image presentation or not (S101). If the information signal includes a signal indicating 3D image presentation, it is determined that the user views a 3D image (YES at S101), and the process proceeds to step S111. At step S111, the focal length fixing section 300 generates a fixing signal for fixing the focal length of the varifocal lens 150 at a predetermined focal length, e.g., 2 m (S111). The lens controller 140 acquires this fixing signal, and stores a directed focal length (S106).

On the other hand, if the signal indicating 3D image presentation is not received as the information signal (NO at S101), the process proceeds to step S102, and the eye movement sensor 110 acquires an eye movement state of the user and determines whether there is eye movement or not. If the eye movement sensor 110 detects eye movement (YES at S102), the process proceeds to step S103. If the eye movement sensor 110 does not detect eye movement (NO at S102), the process returns to step S101.

At step S103, the gazing distance determiner 120 determines the gazing distance of the user based on the information on eye movement output from the eye movement sensor 110. Then, the focal length decision section 130 compares a current focal length stored in the lens controller 140 and the gazing distance determined by the gazing distance determiner 120 at step S103, and determines whether to change the focal length or not (S104). If the current focal length differs from the gazing distance, the focal length is changed (YES at S104), and the process proceeds to step S105. On the other hand, if the current focal length is equal to the gazing distance, the focal length is not changed (NO at S104), and the process returns to step S101.

At step S105, the focal length decision section 130 decides the focal length of the varifocal lens 150 based on the gazing distance determined by the gazing distance determiner 120 at step S103 (S105). The lens controller 140 stores the focal length decided by the focal length decision section 130 (S106). In this example, since the varifocal lens 150 can change the focal length continuously from 10 cm to 3 m, the focal length decision section 130 sets the focal length at the gazing distance determined by the gazing distance determiner 120. If the gazing distance is less than 10 cm, the focal length is set at 10 cm. If the gazing distance is 3 m or more, the focal length is set at 3 m.

If the varifocal lens 150 selects a focal length from a plurality of focal lengths, the focal length decision section 130 selects a focal length closest to the gazing distance determined by the gazing distance determiner 120 as the focal length of the varifocal lens 150, among possible focal lengths of the varifocal lens 150.

After step S106, the lens controller 140 outputs a control signal for changing the focal length of the varifocal lens 150 (S107). This focal length is the focal length fixed at step S111 or the focal length fixed at step S105. After executing step S107, the process returns to step S101.

By repeating steps S101-S107 and S111, the focal length of the viewer 10 is always adjusted to an optimum focal length. When the user views a 3D image, the focal length of the viewer 10 is fixed at a predetermined value. Even when the focal length of the viewer 10 is fixed after step S107 by way of step S111, the process proceeds to step S101. Then, when the 3D image viewing detector 200 does not receive a signal indicating 3D image presentation any more, i.e., No at step S101, the focal length of the viewer 10 is adjusted in accordance with eye movement through steps S102-S107. That is, the fixing of the focal length is canceled when the viewing information on the 3D image is not detected any more.

In this manner, in this embodiment, in the viewer that estimates the gazing distance from eye movement of the user and adjusts the focal length of the varifocal lens 150, the 3D image viewing detector 200 receives an information signal from the video display system 210 and detects viewing of a 3D image by the user. When the viewing of a 3D image by the user is detected, the focal length fixing section 300 outputs a control signal for fixing the focal length of the varifocal lens 150 to the lens controller 140, irrespective of eye movement of the user.

In this manner, even when the eyes of the user move in accordance with a virtual distance of an object in a 3D image during viewing of the 3D image by the user, the fixed focal length of the varifocal lens 150 can prevent the viewer 10 from becoming out of focus depending on the virtual distance of the object in the 3D image.

In this embodiment, the focal length to be fixed is, for example, 2 m. However, the present disclosure is not limited to this example. The focal length to be fixed preferably coincides with the distance from the user to the display device. Thus, an estimated distance from the user to the display device in a normal usage state of the video display system 210 may be set at the focal length to be fixed.

In this embodiment, the video display system presenting a 3D image uses a radio signal or an infrared signal, for example, in order to transmit an information signal to the viewer. However, the present disclosure is not limited to these examples. For example, in a case where the video display system 210 is of an active shutter type, a section for transmitting a synchronizing signal of a shutter to dedicated glasses may also serve as a section for transmitting an information signal so that transmission of the information signal is performed together with transmission of the synchronizing signal. The synchronizing signal itself may also be used as an information signal indicating 3D image presentation.

In this embodiment, viewing of a 3D image by the user is detected based on an information signal transmitted from the video display system 210. However, a method for detecting viewing of a 3D image by the user is not limited to this method. For example, a switch for viewing of a 3D image may be provided in the viewer 10 so that viewing of a 3D image by the user can be determined when the user turns the switch on.

In the foregoing description, the varifocal lens 150 changes the focal length to any distance from, for example, 10 cm to 3 m, and when fixing the focal length, fixes the focal length to a predetermined distance of, for example, 2 m. Alternatively, in a case where the number of possible focal lengths of the varifocal lens 150 is limited to plural numbers, the focal length fixing section 300 may fix the focal length to any one of the possible focal lengths.

Figure 8:
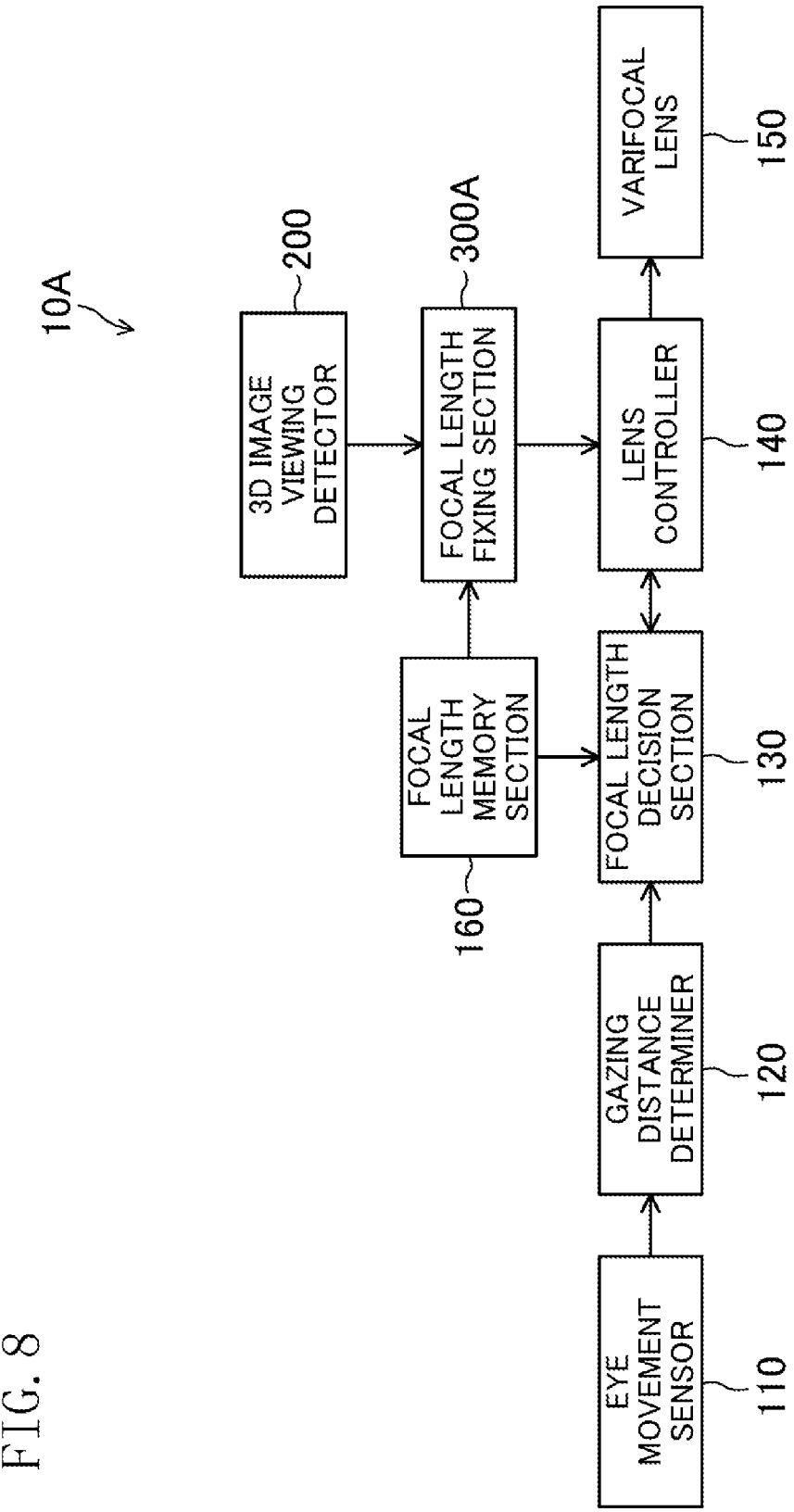
FIG. 8 is a block diagram showing another example configuration of the viewer of the first embodiment.

FIG. 8 is a block diagram showing another example configuration of the viewer of this embodiment. In a viewer 10A shown in FIG. 8, the number of possible focal lengths of the varifocal lens 150 is limited to plural numbers. The focal length memory section 160 stores possible focal lengths of the varifocal lens 150. The possible focal lengths are, for example, 20 cm, 50 cm, and 3 m. Since the focal length memory section 160 is present, unlike the focal length fixing section 300 shown in FIG. 6, a focal length fixing section 300A does not need the distance data memory section 301.

At step S111 of the flow shown in FIG. 7, the focal length fixing section 300A refers to the focal length memory section 160, selects one of the stored focal lengths, and generates a fixing signal for fixing the focal length of the varifocal lens 150 to a selected focal length. For example, in consideration of a normal viewing state of a 3D image, the largest one of the focal lengths stored in the focal length memory section 160 may be selected. In this example, 3 m, i.e., the largest focal length among 20 cm, 50 cm, and 3 m, is selected. The method for selecting a focal length to be fixed is not limited to this example.

First Variation of First Embodiment

In the first embodiment, the focal length fixed when the user views a 3D image is previously determined. On the other hand, in first and second variations of the first embodiment, the distance from the user to the display device is estimated by using an information signal transmitted from the video display system and, based on this estimated distance, a focal length to be fixed is determined.

In the first variation, for a 3D image presentation, the information signal transmitted from the video display system further includes depth information of a 3D image to be presented. When the depth position of the 3D image is located near the display device, the distance from the user to the display device is estimated based on a determination result by the gazing distance determiner 120. Based on this distance, a focal length to be fixed is determined.

A configuration of a viewer according to this variation is similar to that illustrated in FIG. 1. Note that in this variation, the focal length fixing section 300 is replaced by a focal length fixing section 310, and an output from the gazing distance determiner 120 is given to the focal length fixing section 310. The other part of the configuration is similar to that of the first embodiment.

FIG. 9 is a block diagram showing example configurations of the 3D image viewing detector 200 of the viewer 10 and part of the video display system 220 that transmits an information signal according to this variation. The 3D image viewing detector 200 is similar to that illustrated in FIG. 2. As compared to the video display system 210 illustrated in FIG. 2, the video display system 220 additionally includes a video information memory section 225, a depth information memory section 226, and a depth information extractor 227, and includes a video controller 221 instead of the video controller 201, and a signal generator 223 instead of the signal generator 203.

The video information memory section 225 stores 3D or 2D video information. The depth information memory section 226 stores depth information corresponding to 3D video information stored in the video information memory section 225. The depth information extractor 227 extracts depth information on 3D image to be presented frame by frame, and outputs the extracted depth information to the video controller 221.

FIG. 10 schematically shows an example of video information stored in the video information memory section 225 and an example of depth information stored in the depth information memory section 226. As shown in FIG. 10, depth information corresponding to left and right images in each frame is stored in the depth information memory section 226. In the example of FIG. 10, depth information is indicated by a distance (a maximum depth) depressed from the screen plane and a distance (a minimum depth) projecting from the screen plane when the user sees the display device from a standard position. In this example, with the position on the screen being defined as zero, projecting positions are represented by negative values, and depressed positions are represented by positive values.

In the example of FIG. 10, distant mountains are presented in frame 83062 and frame 83063, and the depressed distances of these mountains from the screen plane are infinite. On the other hand, in frame 83064, a person appears in front of a mountain, and thus, the minimum depth is zero, i.e., on the screen plane, and the maximum depth is infinite.

The video controller 221 acquires a 3D image from the video information memory section 225, processes a right-eye image and a left-eye image in accordance with a display format of the display 212, and outputs the processed images to the display 212. If the acquired image is a 3D image, the video controller 221 outputs a signal indicating 3D image presentation and depth information on a 3D image to be presented, to the signal generator 223 for each frame.

Figure 11:
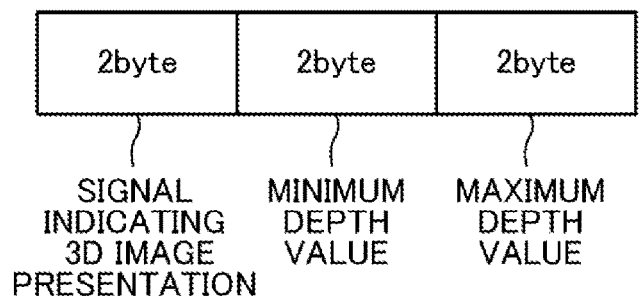
FIG. 11 shows a data format transmitted by the video display system shown in FIG. 9.

The signal generator 223 extracts a maximum depth and a minimum depth in each frame from the output of the video controller 221, and generates an information signal as shown in, for example, FIG. 11. An information signal shown in FIG. 11 includes a double-byte signal indicating 3D image presentation, a double-byte minimum value of the depth, and a double-byte maximum value of the depth in a target frame. The order and size of data in the information signal are not limited to those shown in FIG. 11. The transmitter 214 transmits the information signal generated by the signal generator 223 wirelessly, for example.

In the 3D image viewing detector 200, the receiver 201 receives the transmitted information signal. If the information signal received by the receiver 201 includes a signal indicating 3D image presentation, the signal detector 202 outputs the information signal to the focal length fixing section 310.

Figure 12:
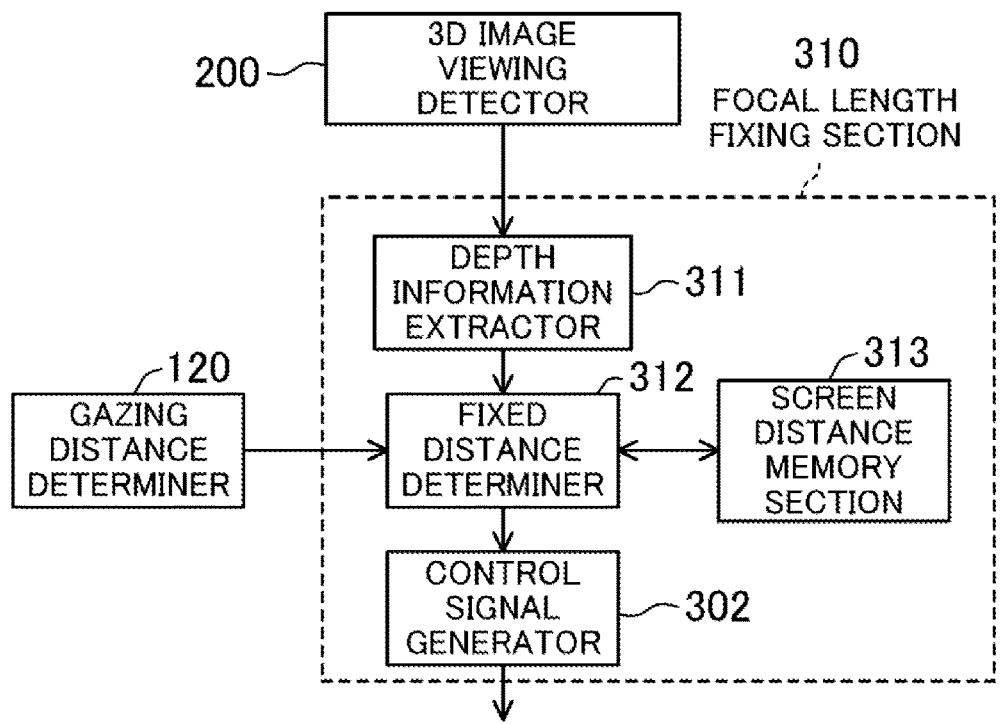
FIG. 12 is a block diagram showing an example configuration of a focal length fixing section of the viewer of the first variation of the first embodiment.

FIG. 12 is a block diagram showing an example configuration of the focal length fixing section 310 in detail. The focal length fixing section 310 shown in FIG. 12 includes a depth information extractor 311, a fixed distance determiner 312, a screen distance memory section 313, and a control signal generator 302. The control signal generator 302 is similar to the control signal generator 302 in the focal length fixing section 300 shown in FIG. 6.

The depth information extractor 311 extracts depth information from an information signal from the 3D image viewing detector 200. In accordance with the extracted depth information and gazing distance information output from the gazing distance determiner 120, the fixed distance determiner 312 estimates a distance from the user to the screen plane presenting a 3D image, and determines a focal length to be fixed. The screen distance memory section 313 stores the distance estimated by the fixed distance determiner 312 from the user to the screen plane.

Figure 13:
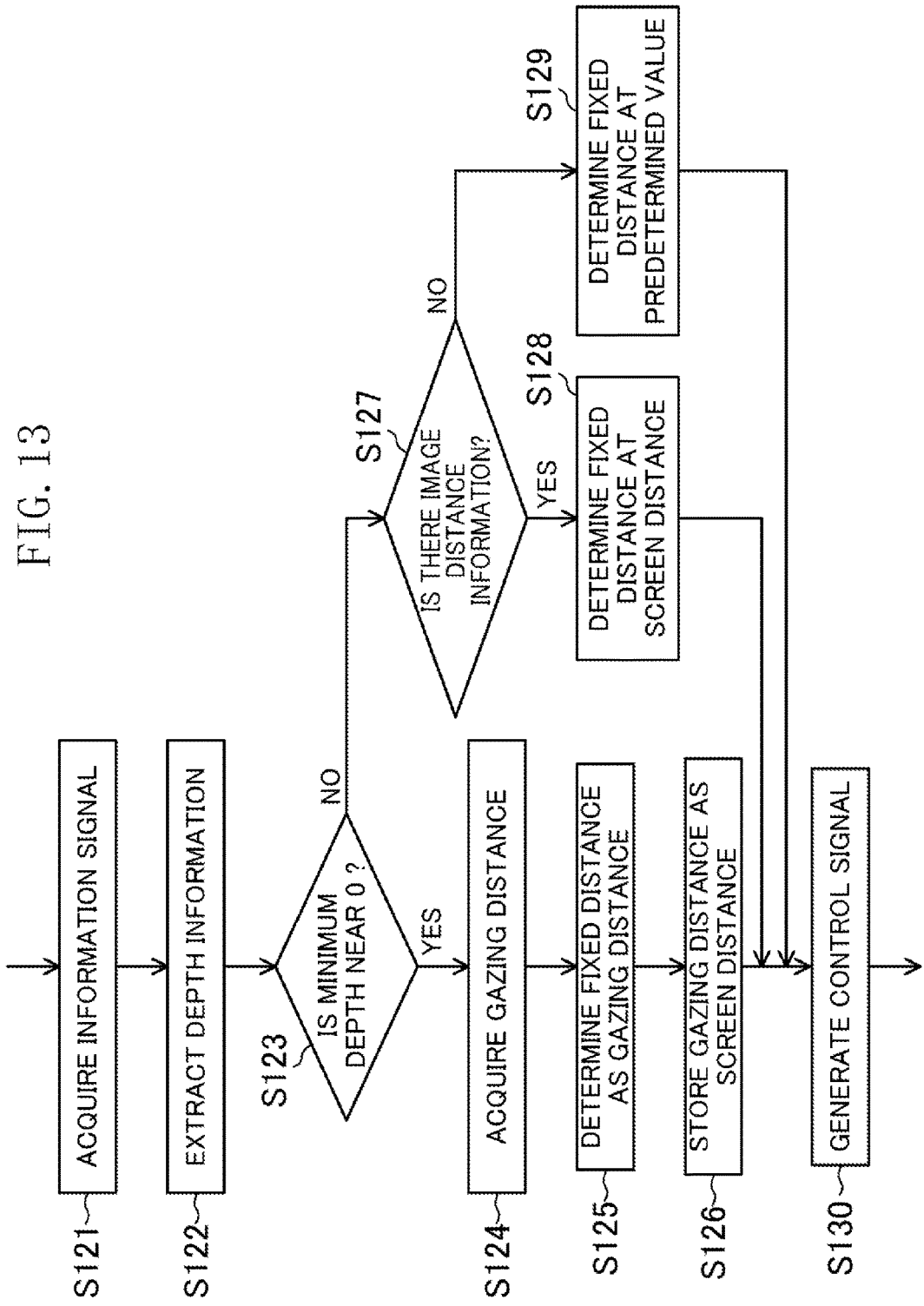
FIG. 13 is a flowchart showing an example of operation of a focal length fixing section shown in FIG. 12.

FIG. 13 is a flowchart showing an example of operation of the focal length fixing section 310. Referring to FIG. 13, operation of the focal length fixing section 310 will be described.

When the depth information extractor 311 acquires an information signal from the 3D image viewing detector 200 (S121), the depth information extractor 311 extracts depth information from the information signal in the data format as shown in, for example, FIG. 11 (S122). The fixed distance determiner 312 determines whether the minimum depth in the extracted depth information is near zero or not, i.e., whether the depth position of a 3D image is at a screen position of the display device or not (step S123). If the minimum depth is within a predetermined range including zero, for example, it is determined that the minimum depth is near zero, i.e., the depth position of the 3D image is at the screen position of the display device. If the video display system is a large-size television set, for example, it is sufficient that the minimum depth is within a range of about 10 cm in front of and at the rear of the screen position. That is, it is sufficient that the minimum depth is within a range in which the eye movement of the user is estimated to be substantially the same as when the user sees the screen position of the display device.

If the minimum depth is near zero (YES at S123), the fixed distance determiner 312 acquires a gazing distance output from the gazing distance determiner 120 (S124), and determines the acquired gazing distance as a fixed distance at which the focal length of the varifocal lens 150 is fixed (S125). Then, the screen distance memory section 313 stores the gazing distance output from the fixed distance determiner 312 as a screen distance (S126).

On the other hand, if the minimum depth is not near zero (NO at S123), the fixed distance determiner 312 refers to the screen distance memory section 313, and determines whether the screen distance is stored or not (S127). If the screen distance memory section 313 stores the screen distance (YES at S127), the fixed distance determiner 312 determines the screen distance stored in the screen distance memory section 313 as a focal length to be fixed (S128). If the screen distance memory section 313 does not store the screen distance (NO at S127), the fixed distance determiner 312 determines a focal length to be fixed at a predetermined value, e.g., 2 m (S129).

The control signal generator 302 generates a control signal for fixing the focal length at the fixed distance determined at step S125, S128, or S129, and outputs the control signal to the lens controller 140 (S130).

Operation of the flow shown in FIG. 13 may be performed for each several frames.

In this variation, the focal length to be fixed is determined based on the screen distance estimated based on the gazing distance of the user. Thus, even when the distance between the user and the display is smaller or larger than a standard distance, the focal length with which the user can view a 3D image comfortably can be maintained.

In this variation, the estimated screen distance is determined as the focal length to be fixed without change. However, the disclosure is not limited to this example. For example, if the number of possible focal lengths of the varifocal lens 150 is limited to plural numbers, a focal length closest to the estimated screen distance may be selected as a fixed distance.

Second Variation of First Embodiment

In a second variation of the first embodiment, the information signal transmitted from the video display system further includes screen size information on the display device displaying a 3D image in the case of 3D image presentation. Based on this screen size information, the distance from the user to the display device is estimated. A focal length to be fixed is determined based on this distance.

A configuration of a viewer according to this second variation is similar to that illustrated in FIG. 1. Note that the focal length fixing section 300 is replaced by the focal length fixing section 320. The other part of the configuration is similar to that of the first embodiment.

Figure 14:
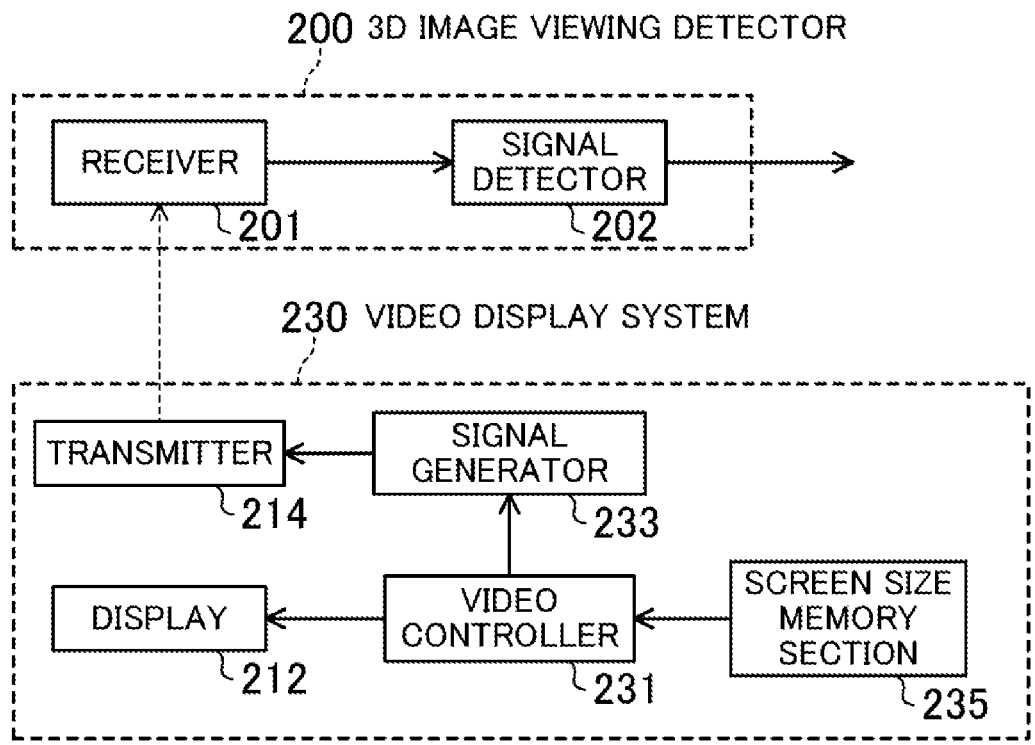
FIG. 14 is a block diagram showing example configurations of a 3D image viewing detector and part of a video display system of a viewer according to a second variation of the first embodiment.

FIG. 14 is a block diagram showing an example configuration of the 3D image viewing detector 200 of the viewer 10 and part of a video display system 230 that transmits an information signal according to this variation. The 3D image viewing detector 200 is similar to that illustrated in FIG. 2. As compared to the video display system 210 illustrated in FIG. 2, the video display system 230 additionally includes a screen size memory section 235, and includes a video controller 231 instead of the video controller 211, and a signal generator 233 instead of the signal generator 213.

The screen size memory section 235 stores the screen size of the display 212. The video controller 231 acquires a 3D image from a video memory section or a broadcasting receiver (not shown), processes a right-eye image and a left-eye image in accordance with a display format of the display 212, and outputs the processed images to the display 212. If the acquired image is a 3D image, the video controller 231 further outputs a signal indicating 3D image presentation and the screen size information stored in the screen size memory section 235 to the signal generator 233.

Figure 15:
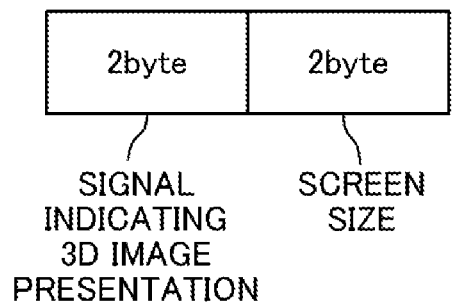
FIG. 15 shows a data format transmitted by the video display system shown in FIG. 14.

The signal generator 233 combines the signal indicating 3D image presentation and the screen size information, and generates an information signal as shown in, for example, FIG. 15. The information signal shown in FIG. 15 includes a double-byte signal indicating 3D image presentation and double-byte screen size information. The order and size of data in the information signal are not limited to those shown in FIG. 15. The transmitter 214 transmits the information signal generated by the signal generator 233 wirelessly, for example.

In the 3D image viewing detector 200, the receiver 201 receives the transmitted information signal. If the information signal received by the receiver 201 includes a signal indicating 3D image presentation, the signal detector 202 outputs the information signal to the focal length fixing section 310.

Figures 16, 17:
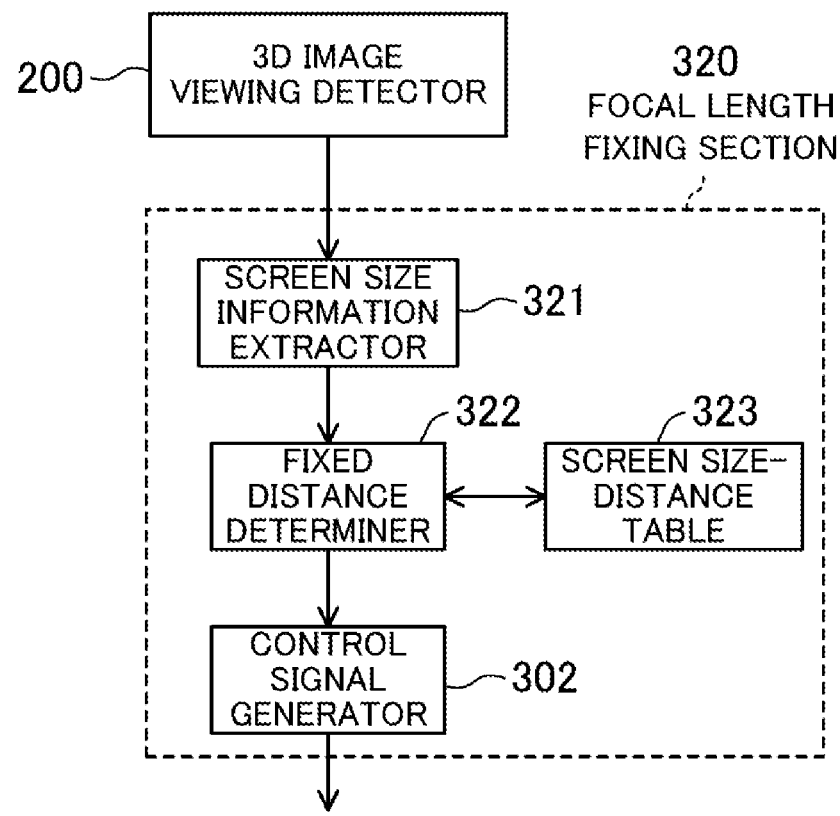
FIG. 16 is a block diagram showing an example configuration of a focal length fixing section of the viewer of the second variation of the first embodiment.
FIG. 17 schematically shows an example of information stored in a screen size-distance table of the focal length fixing section shown in FIG. 16.

FIG. 16 is a block diagram showing an example configuration of the focal length fixing section 320 in detail. The focal length fixing section 320 shown in FIG. 16 includes a screen size information extractor 321, a fixed distance determiner 322, a screen size-distance table 323, and a control signal generator 302. The control signal generator 302 is similar to the control signal generator 302 in the focal length fixing section 300 shown in FIG. 6.

The screen size information extractor 321 extracts screen size information from an information signal from the 3D image viewing detector 200. The fixed distance determiner 322 refers to the screen size-distance table 323, extracts a distance corresponding to the screen size information, and determines the extracted distance as a focal length to be fixed.

FIG. 17 shows an example of content stored in the screen size-distance table 323. For example, the screen sizes are associated with the distances from the user to the display, e.g., a screen size of 20 inch is associated with a distance of 50 cm. In this variation, the table is created in accordance with a rule in which the distance from the user to the display increases as the screen size increases. The fixed distance determiner 322 refers to a screen size-distance table as shown in FIG. 17, and determines a fixed distance in accordance with screen size information.

In this variation, a focal length to be fixed is determined based on the estimated screen distance by using the screen size information. Thus, the focal length with which the user can view a 3D image more comfortably can be maintained.

In this variation, the estimated screen distance is determined as the focal length to be fixed without change. However, the disclosure is not limited to this example. For example, if the number of possible focal lengths of the varifocal lens 150 is limited to plural numbers, a focal length closest to the estimated screen distance may be selected as a fixed distance. Alternatively, data on distances in the screen size-distance table 323 may be previously set as focal lengths the varifocal lens 150 can select.

Second Embodiment

In the first embodiment, the video display system always transmits an information signal indicating 3D image presentation, irrespective of whether the viewer is near the system or not during presentation of a 3D image. On the other hand, in a second embodiment, a video display system determines whether a user wearing a viewer looks toward a display device or not. If the system determines that the user does not look toward the display device, an information signal indicating 3D image presentation is not transmitted.

Figure 18:
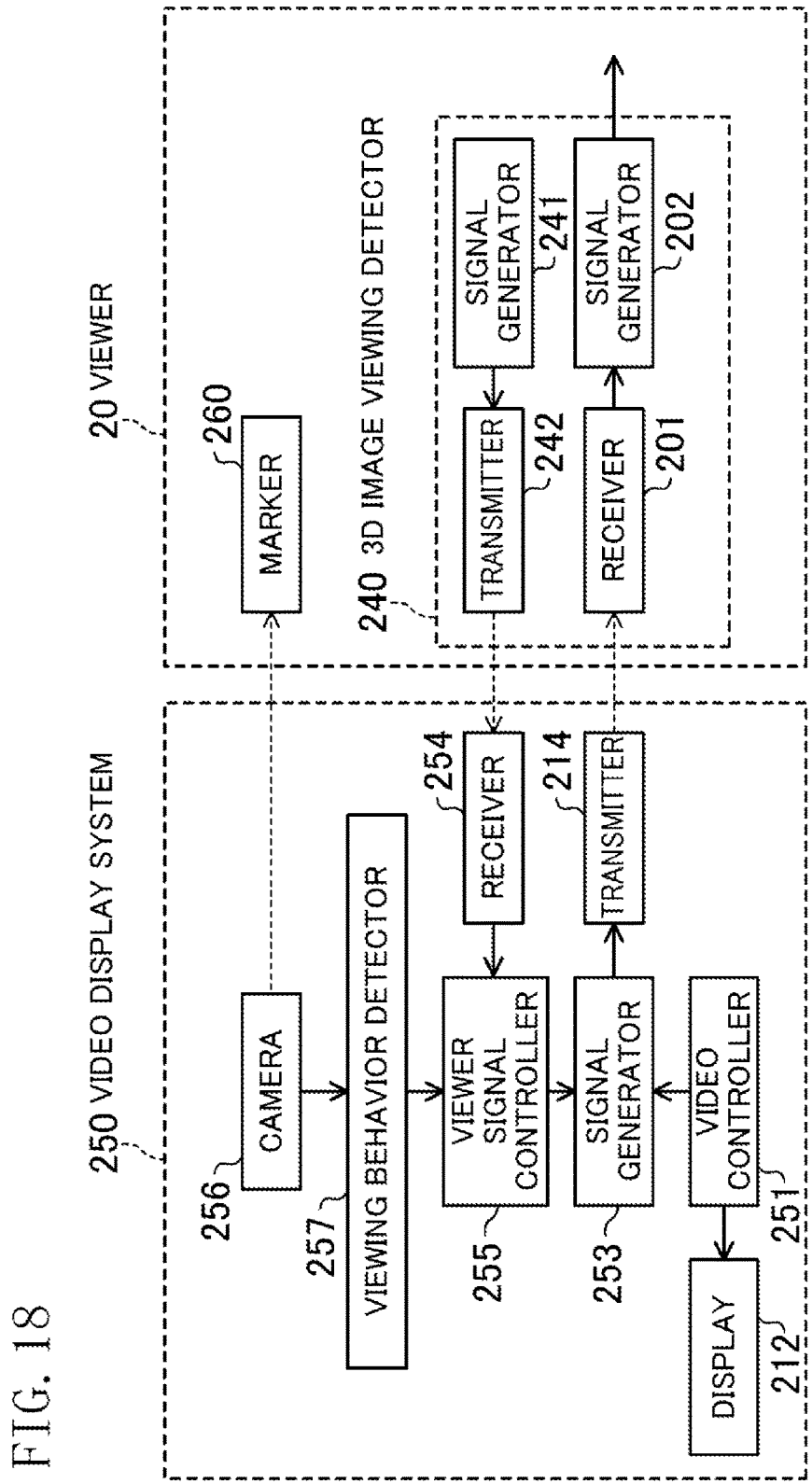
FIG. 18 is a block diagram showing an example configuration of a viewer and part of a video display system according to a second embodiment.

FIG. 18 is a block diagram showing an example configuration of a viewer 20 and part of a video display system 250 that transmits an information signal according to the second embodiment. The viewer 20 shown in FIG. 18 includes markers 260 in addition to the configuration of FIG. 1, and also includes a 3D image viewing detector 240 instead of the 3D image viewing detector 200. The markers 260 are recognized as a predetermined shape when the viewer 20 is seen from the front. The other part of the configuration including, for example, a varifocal lens 150 is not shown. Operation of fixing the focal length is similar to that of the first embodiment.

FIG. 19 schematically illustrates an example appearance of the viewer 20 of the second embodiment. The viewer 20 illustrated in FIG. 19 is designed such that markers a and b of the same size and the same shape are symmetrically disposed at the right and left sides, respectively, of the front surface.

The 3D image viewing detector 240 includes a signal generator 241 and a transmitter 242 in addition to the receiver 201 and the signal detector 202 shown in FIG. 2. While the viewer 20 is adjusting a focal point in accordance with eye movement of the user, the signal generator 241 generates a viewer signal. The transmitter 242 transmits the viewer signal generated by the signal generator 241 to the outside.

The video display system 250 includes a camera 256, a viewing behavior detector 257, a viewer signal controller 255, a signal generator 253, a receiver 254, a transmitter 214, a video controller 251, and a display 212.

The video controller 251 acquires a 3D image from a video broadcasting receiver or a video information memory section (not shown), processes a right-eye image and a left-eye image in accordance with a display format of the display 212, and outputs the processed images to the display 212. If the acquired image is a 3D image, the video controller 251 outputs a signal indicating 3D image presentation to the signal generator 253.

The camera 256 serves as a sensor for measuring viewing behavior of the user wearing the viewer 20. Specifically, for example, the camera 256 is disposed on the front of the display 212, and faces forward. When the user wearing the viewer 20 is located in front of the display 212, the camera 256 is capable of capturing an image of the viewer 20 including the markers 260. The viewing behavior detector 257 detects images of the markers 260 from the image captured by the camera 256, and determines whether the user wearing the viewer 20 actually looks toward the display 212 or not, based on the image. The camera 256 only needs to capture a front view from the display 212, and the location thereof is not specifically limited.

FIGS. 20A and 20B schematically illustrate the positions of the markers 260 relative to the display 212 and corresponding images captured by the camera 256. In FIG. 20A, the user actually looks toward the display 212, and thus, the viewer 20 faces toward the front of the display 212. Accordingly, the images of the markers a and b are symmetric. On the other hand, in FIG. 20B, although the user is located in front of the display 212, the user actually looks toward a direction different from the display 212. Thus, the viewer 20 does not face toward the front of the display 212. Accordingly, the images of the markers a and b are not symmetric.

In this manner, it is determined whether the user wearing the viewer 20 actually looks toward the display 212 or not based on whether the images of the markers a and b are symmetric or not.

The receiver 254 receives a viewer signal transmitted from the viewer 20. The viewer signal controller 255 determines whether to permit generation of a signal indicating 3D image presentation, in accordance with the viewer signal received by the receiver 254 and a detection result of the viewing behavior detector 257.

When signal generation is permitted by the viewer signal controller 255, the signal generator 253 generates a signal indicating 3D image presentation as an information signal, in accordance with an output of the video controller 251. The transmitter 214 transmits the information signal generated by the signal generator 253.

Figure 21:
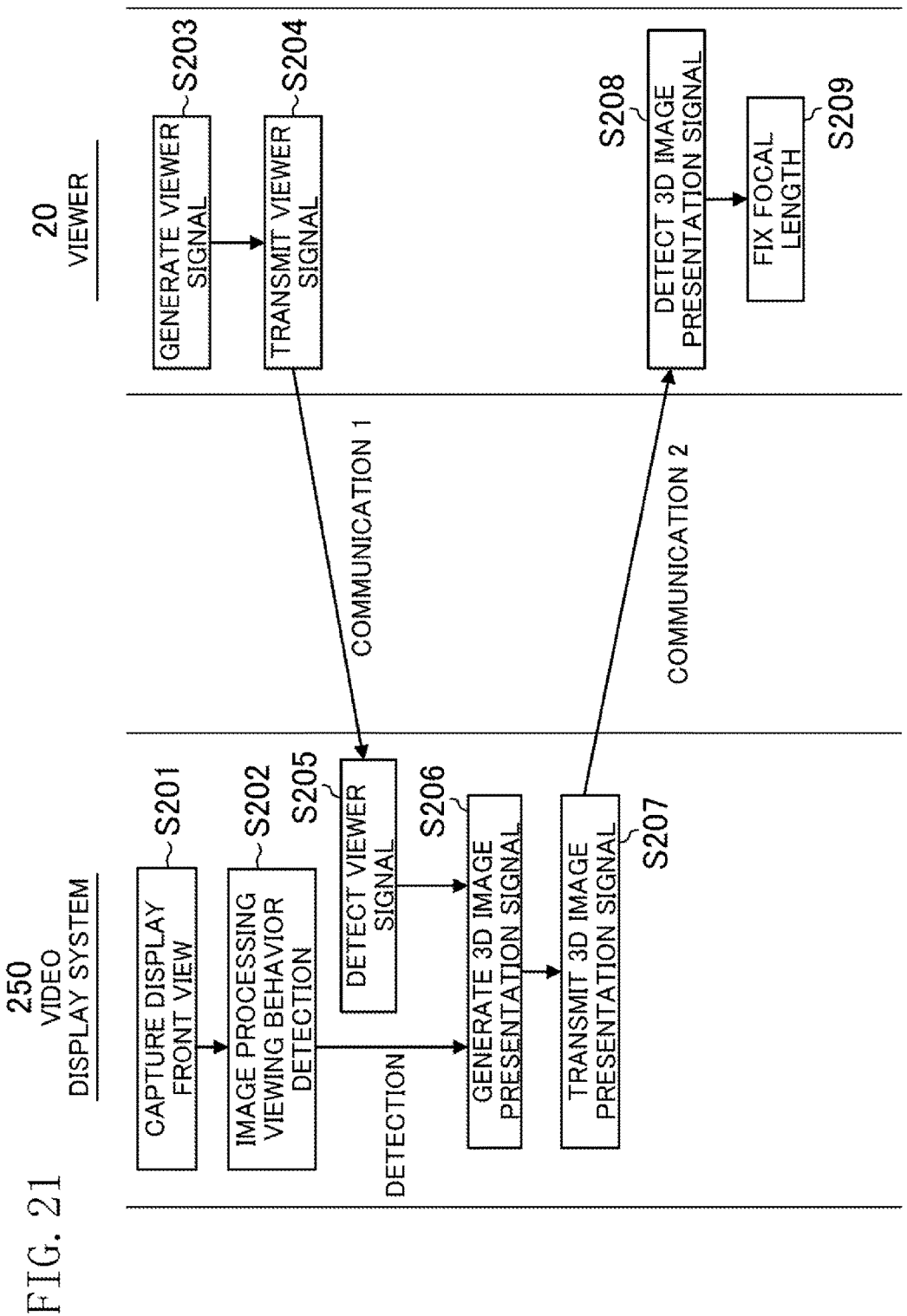
FIG. 21 shows an example of communication operation between the viewer and the video display system shown in FIG. 18.
Figure 22:
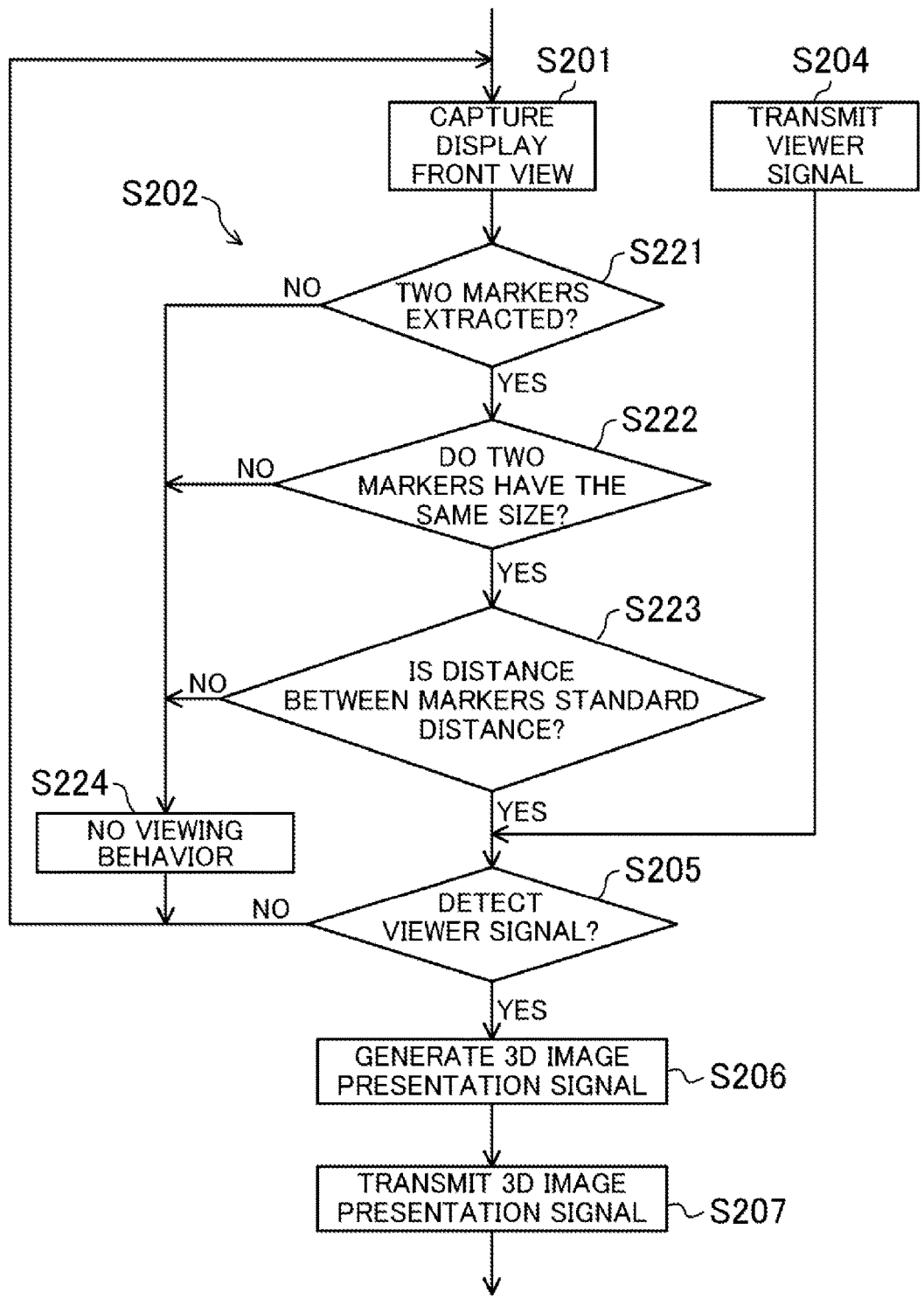
FIG. 22 is a flowchart showing an example of operation of the viewer and the video display system shown in FIG. 18.

Referring now to FIGS. 21 and 22, operation of the configuration shown in FIG. 18 will be described.

First, the camera 256 captures a front view of the display 212 (S201). The viewing behavior detector 257 searches images obtained at step S201 for images of the markers 260 through image processing. Then, it is detected whether there is a viewing behavior of the user or not (S202).

Specifically, step S202 is performed in a manner shown in FIG. 22, for example. If two marker images are extracted from captured images (YES at S221), the process proceeds to step S222. On the other hand, no marker images are extracted or only one marker image is extracted (NO at S221), the process proceeds to step S224, and it is determined that there is no viewing behavior of the user, i.e., the user does not look toward the display 212.

At step S222, the viewing behavior detector 257 determines whether the extracted two marker images have the same size or not. If the images have the same size (YES at S222), the process proceeds to step S223. On other hand, if the two marker images have different sizes (NO at S222), the process proceeds to step S224, and it is determined that there is no viewing behavior of the user. The comparison of image sizes in this example is performed such that if the difference between the image sizes is a predetermined value or less, the images are determined to have the same size.

At step S223, the viewing behavior detector 257 determines whether the distance between the extracted marker images is a standard distance or not. If the distance is a standard distance (YES at S223), the process proceeds to step S205. On the other hand, if the distance is not a standard distance (NO at S223), the process proceeds to step S224, and it is determined that there is no viewing behavior of the user. The determination of the distance between images is performed by, for example, preparing a table in which marker image sizes are associated with standard distances between markers, reading a standard distance corresponding to the marker image size measured at step S222 from the table, and comparing the standard distance with the distance between the marker images. In this comparison, if the difference between the standard distance and the distance between the marker images is a predetermined value or less, for example, the distance is determined to be equal to the standard distance.

That is, in this example, two markers are captured in the same size. In addition, if the distance between the markers is a standard distance, it is determined that the user wearing the viewer 20 looks toward the display 212.

If it is determined that there is no viewing behavior (S224), the process returns to step S201. Specifically, if the viewing behavior detector 257 determines that the user does not look toward the display 212, transmission of a signal indicating 3D image presentation as an information signal is avoided.

On the other hand, while the viewer 20 is adjusting the focal point in accordance with eye movement, the signal generator 241 generates a viewer signal (S203). Then, the transmitter 242 transmits the viewer signal (S204, communication 1).

At step S205, in the video display system 250, the viewer signal controller 255 searches signals received by the receiver 254 for the viewer signal transmitted from the viewer 20. If the viewer signal is detected (YES at S205), the viewer signal controller 255 outputs permission of generation of a signal indicating 3D image presentation. The signal generator 253 generates a signal indicating 3D image presentation in accordance with the output of the viewer signal controller 255 (S206). The transmitter 214 transmits the signal indicating 3D image presentation generated at step S206 as an information signal (S207, communication 2). On the other hand, no viewer signal is detected (NO at S205), the viewer signal controller 255 does not permit generation of a signal indicating 3D image presentation, and the process returns to step S201.

In the 3D image viewing detector 240, when the receiver 201 receives the information signal transmitted from the video display system 250 (communication 2), the signal detector 202 detects a signal indicating 3D image presentation (S208), and outputs the signal to the focal length fixing section 300 (S209).

In this manner, in the second embodiment, the viewer 20 includes symmetric markers 260. The video display system 250 acquires an image of a front view of the display with the camera 256. Based on captured marker images, it is determined whether the user wearing the viewer 20 looks toward the display 212 or not. If it is determined that the user looks toward the display 212, a signal indicating 3D image presentation is transmitted to the viewer 20 that has transmitted the viewer signal to the video display system 250.

Then, the viewer 20 fixes the focal length only when the user sees a 3D image even in a situation where the user is spatially close to the video display system 250. When the user does not see the display 212 presenting a 3D image, the focal length can be adjusted in accordance with eye movement. Accordingly, when the user of the viewer 20 sees a 3D image, the focal length is fixed at the display 212 so that the user can see the image clearly. On the other hand, when the user does not see the display 212 though being located near the video display system 250, the focal length is adjusted so that an object can be always seen clearly with an appropriate focal length.

In this embodiment, the viewer 20 includes the markers 260 of the same size and the same shape symmetrically disposed at the right and left sides of the front surface. Alternatively, the configuration of the markers 260 is not limited to this example. The marker is symmetric at least when seen from the front, and only needs to be used for determining whether the viewer looks toward the display depending on whether the marker images captured by the camera are symmetric or not.

In this embodiment, a viewer signal is transmitted from the viewer 20 to the video display system 250. Alternatively, no viewer signal may be transmitted. In this case, when it is determined that the user wearing the viewer looks toward the display, the video display system transmits a signal indicating 3D image presentation.

In this embodiment, operation of fixing the focal length by the viewer 20 is similar to that described in the first embodiment, but may be similar to those described in the first and second variations of the first embodiment.

Third Embodiment

In a third embodiment, an information signal indicating 3D image presentation is transmitted through a medium showing high straightness in travelling, e.g., infrared light. In the viewer, a reception range of the medium is limited to a predetermined angle range including a front view. Thus, the viewer receives a signal indicating 3D image presentation only when the user looks toward the display device.

Figure 23:
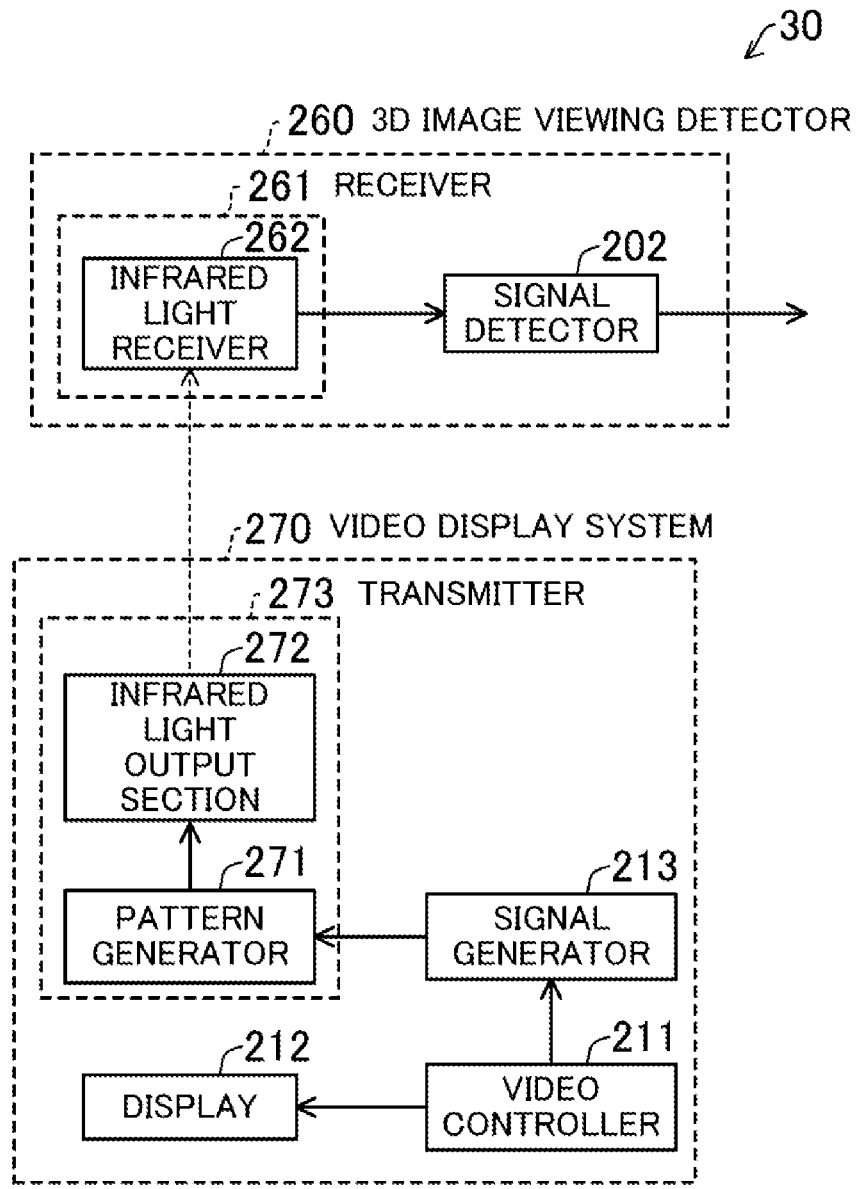
FIG. 23 is a block diagram showing example configurations of a 3D image viewing detector of a viewer and a video display system of a viewer according to a third embodiment.

FIG. 23 is a block diagram showing example configurations of a 3D image viewing detector 260 of a viewer 30 and part of a video display system 270 that transmits an information signal according to the third embodiment. The configuration of the viewer 30 of this embodiment is similar to that of the viewer 10 shown in FIG. 1, but the 3D image viewing detector 200 is replaced by the 3D image viewing detector 260. In the 3D image viewing detector 260, a receiver 261 includes an infrared light receiver 262. As compared to the video display system 210 shown in FIG. 2, the video display system 270 includes a transmitter 273 including a pattern generator 271 and an infrared light output section 272 instead of the transmitter 214.

In this example, the display 212 is of an active shutter type. Specifically, the video display system 270 outputs a synchronizing signal for controlling a shutter of glasses for 3D television. The video controller 211 performs control such that left and right images are alternately output to the display 212, and also outputs information on the synchronizing signal for controlling the shutter of the 3D-television glasses, to the signal generator 213. The signal generator 213 generates a control signal for controlling the shutter of the 3D-television glasses in accordance with information output from the video controller 211. The pattern generator 271 generates an emission pattern of infrared light based on the control signal output from the signal generator 213. The infrared light output section 272 emits infrared light in accordance with the emission pattern generated by the pattern generator 271.

Figure 24A:
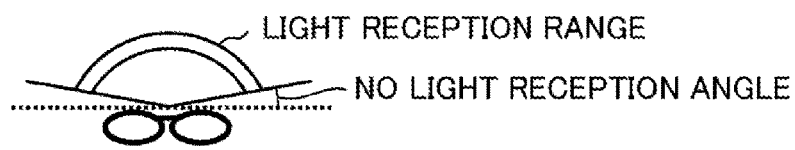
FIGS. 24A-24C are schematic illustrations for describing 3D-television glasses and a light reception range of the viewer of the third embodiment.
Figure 24B:
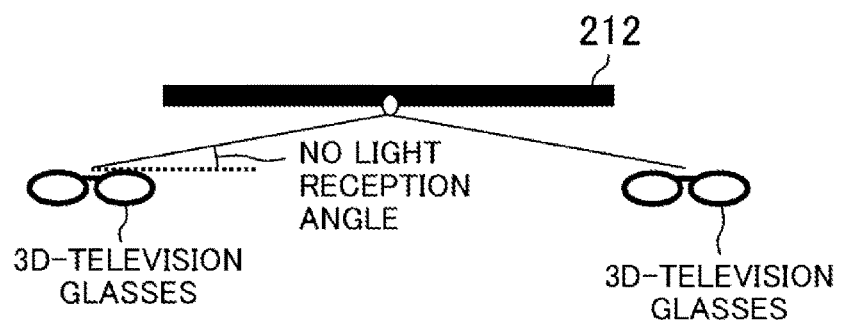
Figure 24C:
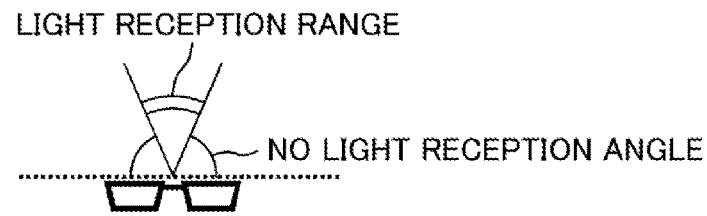

FIGS. 24A, 24B, and 24C schematically illustrate images of reception of infrared light. Specifically, FIG. 24A shows a light reception range of 3D-television glasses, FIG. 24B shows a light reception limit of the 3D-television glasses, and FIG. 24C shows a light reception range of the viewer 30 of this embodiment. As illustrated in FIG. 24A, the 3D-television glasses have a wide reception range for infrared light such that a synchronizing signal can be appropriately received and the user is allowed to see a 3D image irrespective of the angle in seeing the display 212. The light reception range is, for example, a range within 80 degrees to each of the left and right sides from the front of the glasses. As illustrated in FIG. 24B, the display 212 also outputs infrared light in a wide angle, and thus, the user can view a 3D image in a wide range in front of the display 212.

In this embodiment, an information signal indicating 3D image presentation is also transmitted through infrared light. To view a 3D image, the user using the viewer 30 wears a stack of the 3D-television glasses and the viewer 30. As illustrated in FIG. 24C, the light reception range of the viewer 30 is narrower than that of the 3D-television glasses, and is limited to a narrow range including a front view of the viewer 30. The light reception range is, for example, a range within 30 degrees to each of the left and right sides relative to the front.

Figure 25A:
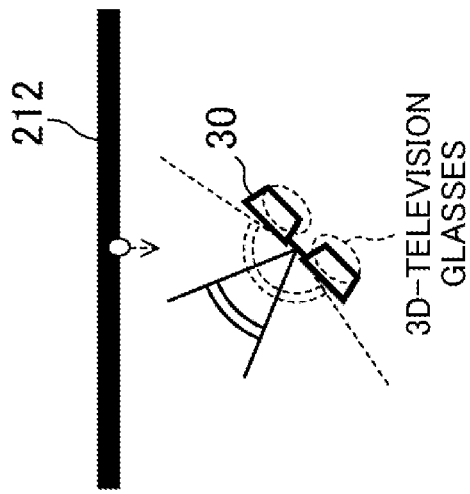
FIGS. 25A and 25B schematically illustrate a difference in light reception state depending on the angle between the viewer of the third embodiment and a 3D television screen.
Figure 25B:
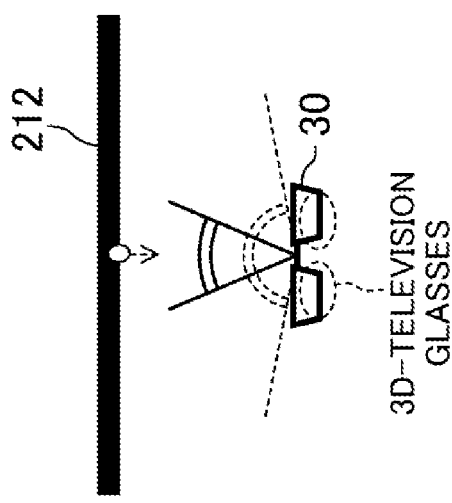

FIGS. 25A and 25B schematically illustrate a difference in light reception state depending on the angle relative to the display 212 in a case where the user wears a stack of the 3D-television glasses and the viewer 30. In FIG. 25A, the user looks toward the front of the display 212. In this case, both the 3D-television glasses and the viewer 30 can receive infrared light. Thus, the 3D-television glasses receive a synchronizing signal for shutter control, and the viewer 30 receives an information signal indicating 3D image viewing and fixes the focal length.

On the other hand, in FIG. 25B, the user is located in front of the display 212 but does not look toward the display 212. In this case, the 3D-television glasses receive infrared light, but the viewer 30 cannot receive infrared light. Thus, the 3D-television glasses perform shutter control in synchronization with display of left-eye and right-eye images in response to a synchronizing signal, whereas the viewer 30 does not receive an information signal indicating 3D viewing. Accordingly, the focal length of the viewer 30 is not fixed, and a focal point is adjusted in accordance with eye movement of the user.

In this manner, in this embodiment, an information signal indicating 3D image presentation is transmitted from the video display system 270 through infrared light. The infrared light reception range of the viewer 30 is limited to a narrow range of a predetermined angle including the front. Thus, the focal length is fixed only when the user faces toward the screen displaying a 3D image, i.e., views a 3D image. Accordingly, it is possible to avoid a problem of fixture of the focal point of the viewer 30 depending only on the location of the user near the system displaying a 3D image regardless of no viewing of the 3D image by the user.

In this embodiment, infrared light is used for communication of an information signal. However, the disclosure is not limited to this example, and a communication medium showing high straightness in travelling, e.g., visible light, may be used.

In this embodiment, the display 212 is of an active shutter type, the video display system 270 transmits a synchronizing signal for shutter control, and an information signal indicating 3D image presentation is transmitted by using a section for transmitting the synchronizing signal. However, the disclosure is not limited to this example. For example, a transmitter of an information signal using, for example, infrared light may be provided separately from, or in addition to, the transmitter of a synchronizing signal. Alternatively, in a case where the display 212 is of a type that does not need transmission of a synchronizing signal, it is sufficient to provide a transmitter for an information signal using, for example, infrared light. In these cases, the range in which the video display system emits infrared light may be limited to a narrow range. For example, the range may be within 30 degrees to each of the left and right sides relative to the front.

The range in which the viewer 30 receives a medium is a predetermined range including the front and is limited to a range in which an information signal is received when the user looks toward the display 212 whereas an information signal is not received when the user does not look toward the display 212. Considering a normal viewing state of the user, the light reception range is set, for example, at a range within 30 degrees or less to each of the left and right sides from the front of the viewer 30.

In this embodiment, the light reception range of the viewer 30 is set narrow. Alternatively, the light reception range may be set wider such that an incident angle of a medium showing high straightness in travelling, e.g., infrared light, is determined, and a signal indicating 3D image presentation is detected only when the incident angle is within a predetermined range.

Figure 26A:
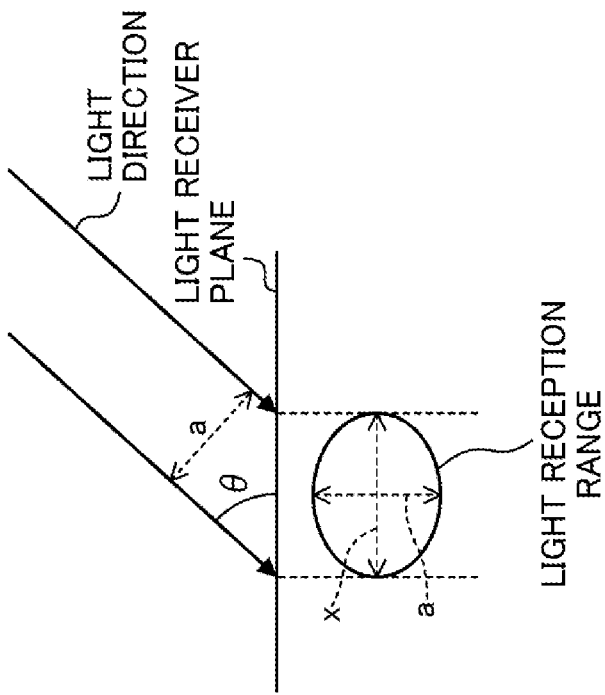
FIGS. 26A and 26B schematically illustrate a method for determining an incident angle of light in the viewer of the third embodiment.
Figure 26B:
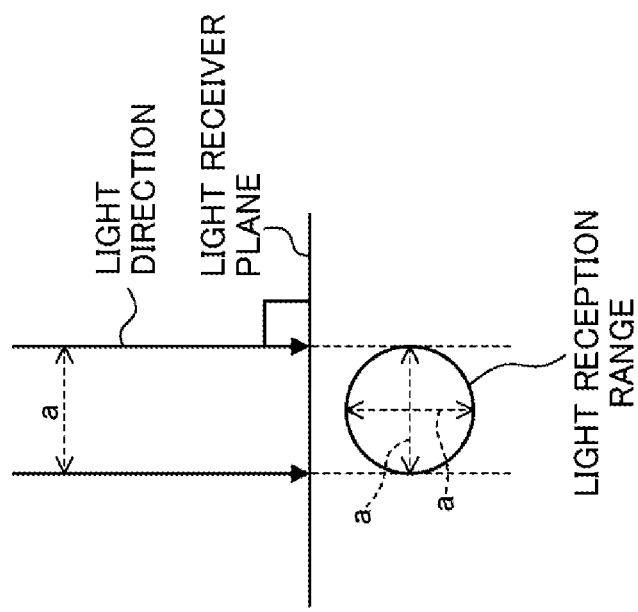
Figure 27B:
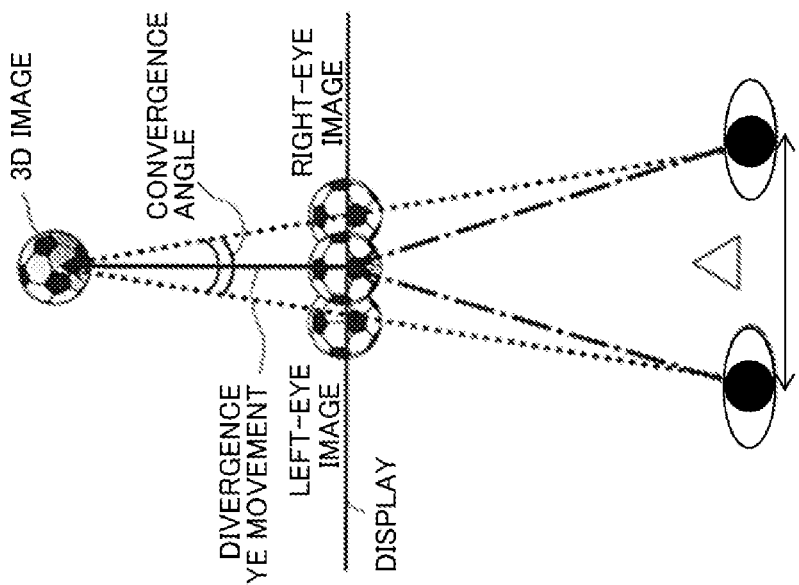
FIGS. 27A and 27B illustrate relationships between a stereoscopic 3D image and vergence eye movement of eyeballs.
Figure 27A:
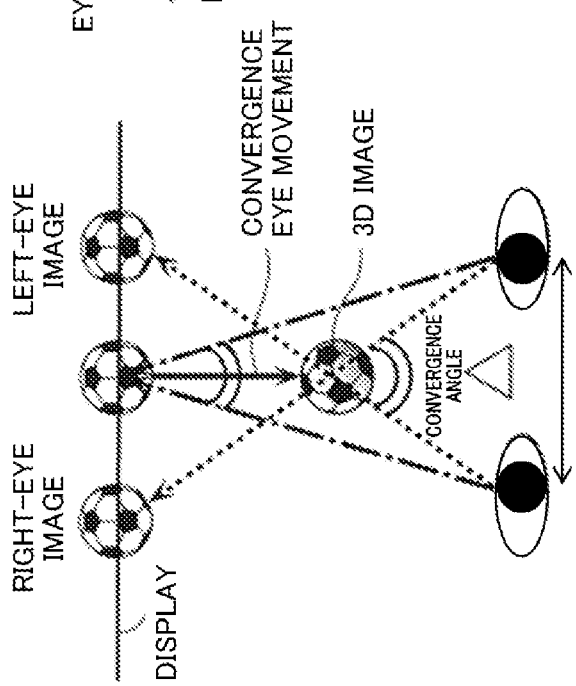
Figure 28A:
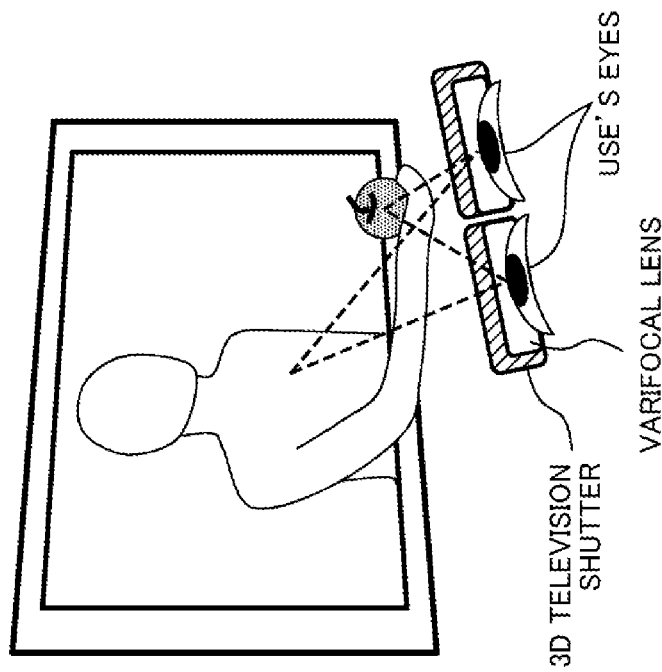
FIGS. 28A and 28B schematically illustrate relationships between an object and a convergence angle of eyes.
Figure 28B:
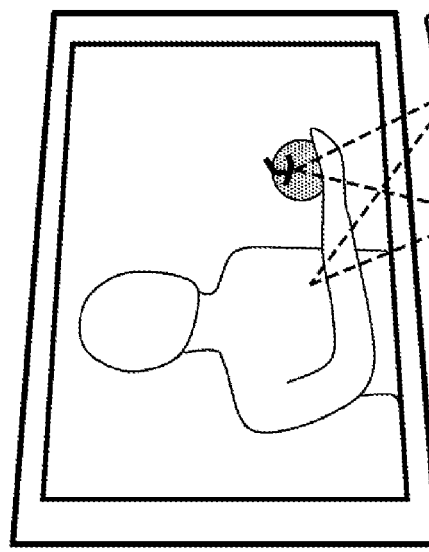

FIGS. 26A and 26B schematically illustrate a method for determining an incident angle. In the example of FIGS. 26A and 26B, the infrared light output section 272 of the video display system 270 emits light whose cross section is circular (with a diameter a). As illustrated in FIG. 26A, when the light direction is perpendicular to the light receiver, the shape of the light reception range is similar to that of light, i.e., circular with a diameter a in this example. On the other hand, as illustrated in FIG. 26B, when the light direction is tilted relative to the light receiver, the light reception range is deformed depending on the tilt angle, and the shape of the light reception range is an ellipse in this example. The incident angle can be determined based on the distortion amount of the shape of the light reception range. The viewer 30 only needs to receive a 3D image presentation signal only when the incident angle is within a predetermined range. In this manner, advantages similar to those of this embodiment can be obtained.

In this embodiment, operation of fixing the focal length by the viewer 30 is similar to the first embodiment. Alternatively, the operation may be similar to those of the first and second variations of the first embodiment.

In the foregoing embodiments, the video display system includes the display device, but the disclosure is not limited to this example. For example, the video display system may transmit a video signal to another display device.

The present disclosure is widely applicable to optical systems using varifocal lenses, e.g., optical systems that adjust focal lengths including viewers such as glasses and goggles, microscopes, binoculars, head-mounted displays, etc.

What is claimed is:

1. A viewer capable of adjusting a focal point in accordance with eye movement of a user, the viewer comprising:
 a varifocal lens;
 a lens controller that adjusts a focal length of the varifocal lens;
 a detector that detects whether the user views a 3D image on a display device which displays either a 2D image or a 3D image; and
 a focal length fixing section that instructs the lens controller to fix the focal length of the varifocal lens irrespective of eye movement of the user when the detector detects that the user views a 3D image.

2. The viewer of claim 1, wherein the detector includes:
 a receiver that receives an information signal transmitted from a video display system; and
 a signal detector that determines that the user views a 3D image when the information signal received by the receiver includes a signal indicating 3D image presentation.

3. The viewer of claim 2, wherein the focal length fixing section estimates a distance from the user to the display device by using the information signal, and determines a focal length to be fixed based on the estimated distance.

4. The viewer of claim 3, further including:
 a gazing distance determiner that determines a gazing distance of the user based on the eye movement of the user, wherein
 the information signal further includes depth information on a 3D image presented by the video display system when the information signal includes the signal indicating 3D image presentation, and
 the focal length fixing section estimates the distance from the user to the display device based on a result of determination by the gazing distance determiner when the depth information indicates that a depth position of the 3D image is at a screen position of the display device.

5. The viewer of claim 3, wherein
 when the information signal includes the signal indicating 3D image presentation, the information signal further includes screen size information on the display device, and
 the focal length fixing section estimates the distance from the user to the display device based on the screen size information in accordance with a rule in which the distance from the user to the display device increases as a screen size of the display device increases.

6. The viewer of claim 1, wherein
focal lengths to be selected in the varifocal lens are limited to a plurality of focal lengths, and
in fixing the focal length of the varifocal lens, the focal length fixing section fixes a focal point of the varifocal lens at a largest focal length among the plurality of focal lengths.

7. The viewer of claim 2, further comprising:
a marker that is recognized as a predetermined shape when viewed from a front.

8. The viewer of claim 7, wherein
the marker comprises a plurality of markers, and
the plurality of markers are disposed symmetrically at left and right ends of a front surface of the viewer.

9. The viewer of claim 2, wherein
the video display system transmits the information signal through a medium,
in the viewer, a reception range of the receiver for receiving the information signal through the medium is limited to a predetermined range including a front of the viewer, and
the predetermined range is set in a range within 30 degrees to each of left and right sides relative to the front.

10. The viewer of claim 9, wherein
the video display system uses 3D image glasses, and transmits a synchronizing signal to the 3D image glasses through the medium, and
in the viewer, the reception range of the receiver medium is narrower than that of the 3D image glasses.

11. The viewer of claim 9, wherein the medium is infrared light or visible light.

12. A video display system configured to transmit an information signal to a viewer, the video display system comprising:
a display device;
a camera that captures a view in front of the display device; and
a viewing behavior detector that determines whether a user wearing the viewer looks toward the display device or not based on whether an image of a marker is recognized as a predetermined shape or not, when the viewer is captured by the camera, wherein
when the viewing behavior detector determines that the user does not look toward the display device, transmission of a signal indicating 3D image presentation as the information signal is avoided,
the viewer comprising:
a varifocal lens;
a lens controller that adjusts a focal length of the varifocal lens;
a detector that detects whether the user views a 3D image;
a focal length fixing section that instructs the lens controller to fix the focal length of the varifocal lens irrespective of eye movement of the user when the detector detects that the user views a 3D image; and
the marker that is recognized as the predetermined shape when viewed from the front;
and the detector includes:
a receiver that receives an information signal; and
a signal detector that determines that the user views a 3D image when the information signal received by the receiver includes a signal indicating 3D image presentation.

13. The video display system of claim 12, wherein
the viewer transmits a viewer signal when a focal point is adjusted in accordance with eye movement of the user, and
when the viewing behavior detector determines that the user looks toward the display device and receives the viewer signal, the video display system transmits the signal indicating 3D image presentation as the information signal.

* * * * *